US012699709B2

(12) United States Patent (10) Patent No.: US 12,699,709 B2

Manna et al. (45) Date of Patent: Aug. 4, 2026

(54) SYSTEM AND METHOD FOR AUTOMATIC RECONCILIATION OF DATA

(71) Applicant: Oracle Financial Services Software Limited, Goregaon (IN)

(72) Inventors: Purabi Manna, Raipur (IN); Sharoon Saxena, Bhopal (IN); Veresh Jain, Bangalore (IN)

(73) Assignee: ORACLE FINANCIAL SERVICES SOFTWARE LIMITED, Mumbai (IN)

( * ) Notice: Subject to any disclaimer, the term of this patent is extended or adjusted under 35 U.S.C. 154(b) by 358 days.

(21) Appl. No.: 18/342,260

(22) Filed: Jun. 27, 2023

(65) Prior Publication Data

US 2025/0005036 A1      Jan. 2, 2025

(51) Int. Cl.
*G06F 16/27* (2019.01)
*G06F 16/28* (2019.01)

(52) U.S. Cl.
CPC ............ *G06F 16/27* (2019.01); *G06F 16/285* (2019.01)

(58) Field of Classification Search
CPC ...... G06Q 30/185; G06Q 40/12; G06Q 20/14; G06Q 40/00; G06Q 50/22; G06Q 10/10; G06F 18/24; G06F 40/247; G06F 16/273; G06F 16/215; G06F 18/22
USPC .......................................................... 705/30
See application file for complete search history.

(56) References Cited

U.S. PATENT DOCUMENTS

| | | | | |
|---|---|---|---|---|
| 8,639,596 B2 * | 1/2014 | Chew | ..................... | G06Q 40/00 |
| | | | | 705/30 |
| 11,354,753 B1 * | 6/2022 | Renegar | ................. | G06N 20/00 |
| 11,410,229 B2 * | 8/2022 | Gorman | ................. | G06Q 40/02 |
| 11,416,867 B2 * | 8/2022 | Lopes | ................... | G06N 3/0442 |
| 11,561,766 B2 * | 1/2023 | Mueller | ............... | G06F 16/215 |
| 2017/0154384 A1 * | 6/2017 | Schroeder | .............. | G06Q 40/12 |
| 2019/0035039 A1 * | 1/2019 | Brekka | .................. | G06Q 50/22 |
| 2019/0205993 A1 * | 7/2019 | Rodriguez | ............ | H04L 67/535 |

(Continued)

FOREIGN PATENT DOCUMENTS

| | | |
|---|---|---|
| CN | 112991048 A | 6/2021 |
| WO | 2022162143 A1 | 8/2022 |

OTHER PUBLICATIONS

Calvo , "How to Leverage Machine Learning Applications in Finance", Artificial Intelligence, Financial Management, Available online at: https://www.techedgegroup.com/blog/how-to-leverage-machine-learning-applications-in-finance, Apr. 18, 2019, pp. 1-5.

*Primary Examiner* — Olusegun Goyea
(74) *Attorney, Agent, or Firm* — Kilpatrick Townsend & Stockton LLP

(57) ABSTRACT

A reconciliation engine and data reconciliation techniques are disclosed that partially use machine learning and natural language processing techniques to overcome challenges associated with traditional manual reconciliation engines and data reconciliation techniques without compromising the accuracy and handle the complexity of the features. In one aspect, a computer-implemented method is provided that includes: accessing a source and target table, performing intra-reconciliation on the source table, grouping the source and target table based on system configurations, reconciling data is iterated over each group, where the reconciling data includes: finding, using a machine learning model, a closest match for each group, and outputting the closest match for each group.

17 Claims, 21 Drawing Sheets

(56) References Cited

U.S. PATENT DOCUMENTS

| | | | | |
|---|---|---|---|---|
| 2019/0251058 A1* | 8/2019 | Robinson | ................ | G06F 18/24 |
| 2021/0118047 A1* | 4/2021 | Gorman | ................ | G06Q 40/02 |
| 2021/0303547 A1* | 9/2021 | Bhargava | ............ | G06F 16/273 |
| 2021/0350382 A1* | 11/2021 | Lopes | ................... | G06Q 20/14 |
| 2021/0374164 A1* | 12/2021 | Ghoula | ................. | G06N 20/00 |
| 2021/0374479 A1* | 12/2021 | Zambetti, Jr. | ......... | G06F 18/217 |
| 2022/0399112 A1* | 12/2022 | Bardot | ................. | G16H 40/40 |
| 2023/0013443 A1* | 1/2023 | Bolen | ................... | G06Q 40/12 |
| 2024/0013100 A1* | 1/2024 | Havel | ................... | G06F 18/22 |
| 2024/0281892 A1* | 8/2024 | Bull | ...................... | G06Q 30/04 |

* cited by examiner

Figure 3B:
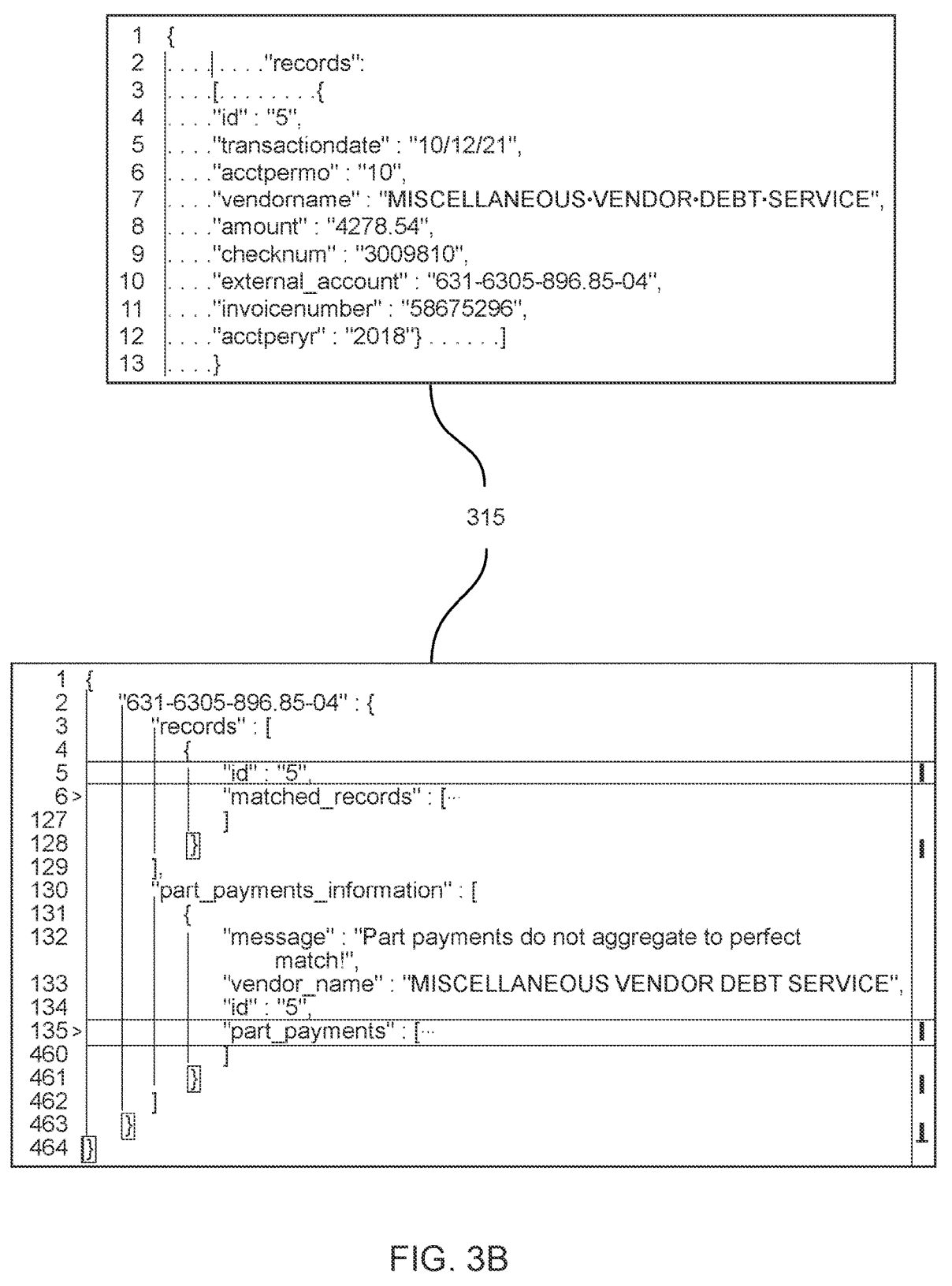

```
 1  {
 2  . . . | . . . ."records":
 3  . . . .[ . . . . . . .{
 4  . . . ."id" : "5",
 5  . . . ."transactiondate" : "10/12/21",
 6  . . . ."acctpermo" : "10",
 7  . . . ."vendorname" : "MISCELLANEOUS·VENDOR·DEBT·SERVICE",
 8  . . . ."amount" : "4278.54",
 9  . . . ."checknum" : "3009810",
10  . . . ."external_account" : "631-6305-896.85-04",
11  . . . ."invoicenumber" : "58675296",
12  . . . ."acctperyr" : "2018"} . . . . .]
13  . . .}
```

315

```
  1   {
  2       "631-6305-896.85-04" : {
  3           "records" : [
  4               {
  5                   "id" : "5",
  6 >                 "matched_records" : [··
                      ]
127
128             }
129         ],
130         "part_payments_information" : [
131             {
132                 "message" : "Part payments do not aggregate to perfect
                        match!",
133                 "vendor_name" : "MISCELLANEOUS VENDOR DEBT SERVICE",
134                 "id" : "5",
135 >               "part_payments" : [··
460                 ]
461             }
462         ]
463     }
464 }
```

Source Table

410

Target Table

405 Source Table After Grouping

410 Target Table After Grouping

Without Grouping, every data point in source table has to be reconciled with every record in target table

405

Source Table After Grouping

Both of these Source record
require single iteration of search
in targets table

410

Target Table After Grouping

Search space is drastically reduced

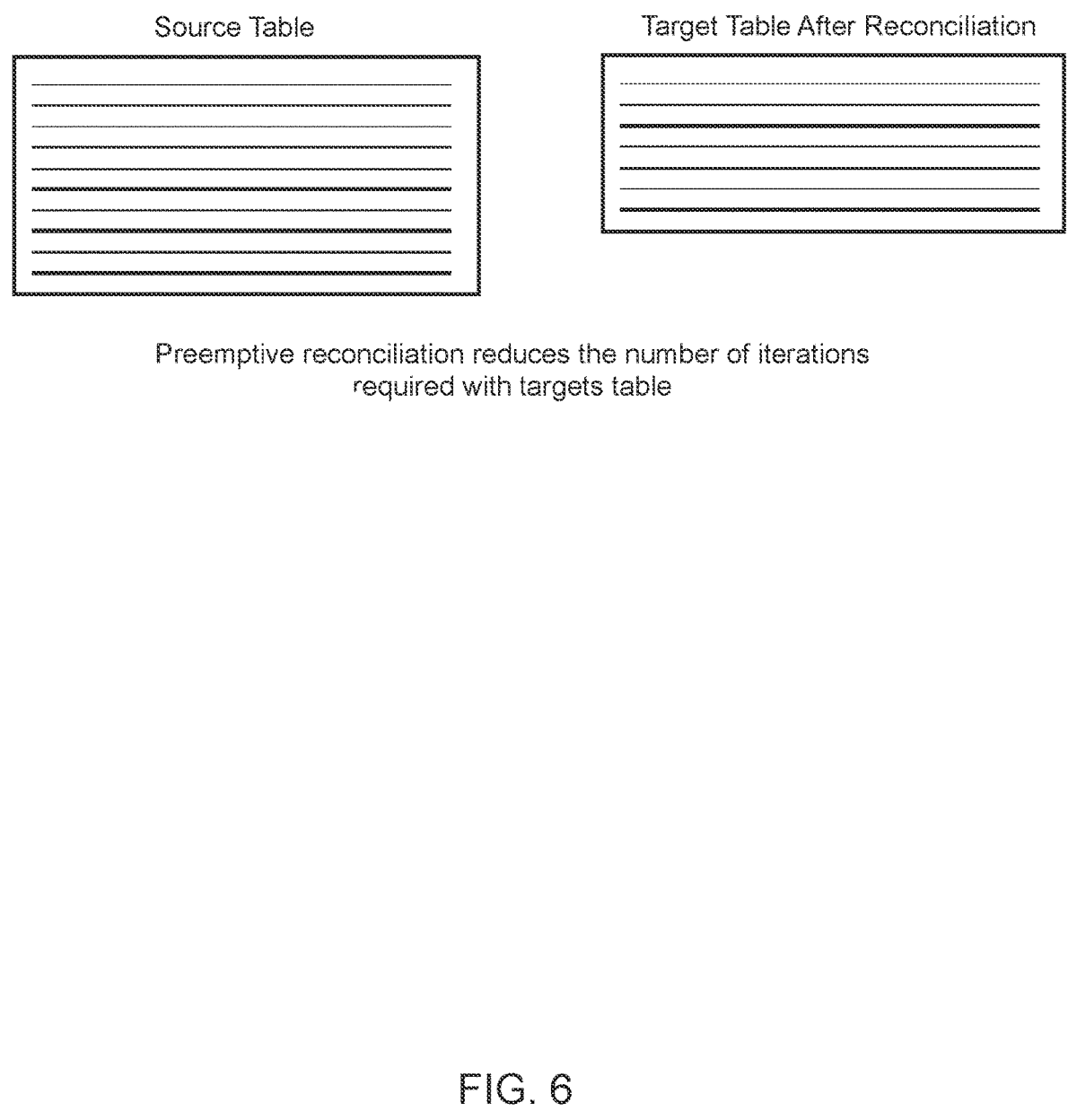

Source Table

Target Table After Reconciliation

Preemptive reconciliation reduces the number of iterations
required with targets table

FIG. 6

Source (Invoice Table)

| ID | DATE | CHECK NUM | CUSTOMERNAME | AMOUNT | INVOICE NUM | ACCOUNT NUM |
|----|------|-----------|--------------|--------|-------------|-------------|
| 34 | 10/12/2021 | MTN3011209 | MARC VENDOR | 1000 | CAOXN95718 | EXT631630504 |
| 36 | 9/20/2020 | ITR45369876 | MONARCH | 5002 | ZYTOT376486 | EAM34572834 |
| 37 | 8/23/2020 | ITR30478269 | VENDOR | 4000 | XMLTN453768 | XM457964427 |

Target (Payment Table)

| ID | TRANSAC TION DATE | CHECK NUM | CUSTOMER NAME | AMO UNT | INVOICE NUMBER | ACCOUNT NUMBER | NARRATION |
|----|-------------------|-----------|---------------|---------|----------------|----------------|-----------|
| 60 | 11/13/2021 | MTN3011210 | MARC VENDO | | CAOXN95720 | EXT631630504 | Payment for CAOXN95718 of rs 600 |
| 61 | 11/13/2021 | MTN3011210 | MAC VENDOR | | CAOXN95720 | EXT631630504 | Payment for CAOXN95718 of Rs 6000 |
| 62 | 11/13/2021 | MTN3011210 | MARC ENDOR | | CAOXN95720 | EXT631630504 | Payment for CAOXN95718 of Rs 1600 |
| 63 | 11/13/2021 | MTN3011210 | | 300 | CAOXN95720 | EXT631630504 | Payment for MARC VENDOR with account CAOXN95718 |
| 64 | 12/30/2020 | ITR45369878 | MONARCH | 4000 | ZYTOT376487 | EAM34572834 | |
| 65 | 12/31/2020 | ITR45369879 | MONARCH | 1000 | ZYTOT376488 | EAM34572834 | |
| 66 | 8/23/2020 | ITR30478270 | VENDO | 4000 | XMLTN453768 | XM457964427 | |
| 67 | 8/23/2020 | ITR30478270 | VENDRO | 4000 | XMLTN453768 | XM457964427 | |

FIG. 7A

```
{
  "K-Neighbors" : 5,
  "db_table_name" : [
    {
      "source_table_name" : "invoice_table",
      "target_table_name" : "payment_table"
    }
  ],
  "multicolumn" : [
    {
      "status" : "yes",
      "feature_name" : "AMOUNT",
      "matched_feature_name_with_columns" : ["AMOUNT", "NARRATION"]
    }
  ],
  "config_part_payment" : [
    {
      "return_part_payments" : "true",
      "tolerance" : 3,
      "column_to_consider" : "vendorname",
    }
  ],
```

```
"config_table_mode" : [
    {
      "_comment" : "table mode has to be True or False only in double
quotes",
      "batch_size" : "2",
      "recon_key" : "external_account",
      "part_payment_table_name" : "result_part_payments",
      "partial_match_table_name" : "result_partial_match"
    }
  ],
  "source_target_column_mapping" : [
    {
      "vendorname" : ["vendor_name"],
      "external_account" : ["externalaccount","external_acc","account_number"]
    }
  ]
}
```

FIG. 7B

Reconciled Source Table

Source Table after Grouping

Grouping of Source Table groups similar transaction together.

FIG. 8A

Target Table
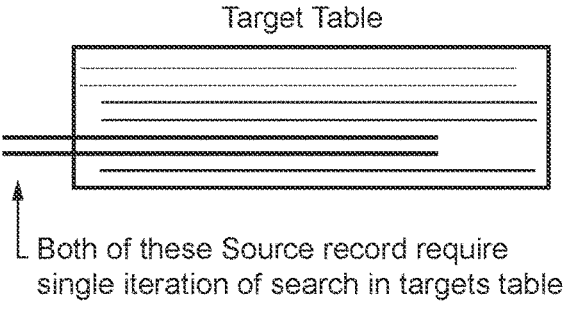
L Both of these Source record require
single iteration of search in targets table
Target Table after Grouping
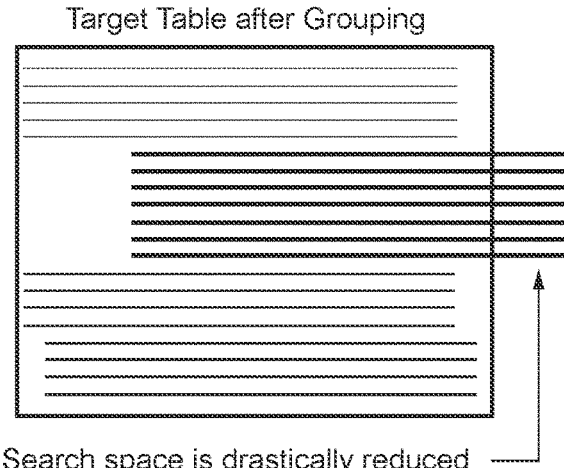
Search space is drastically reduced ----
FIG. 8C

910

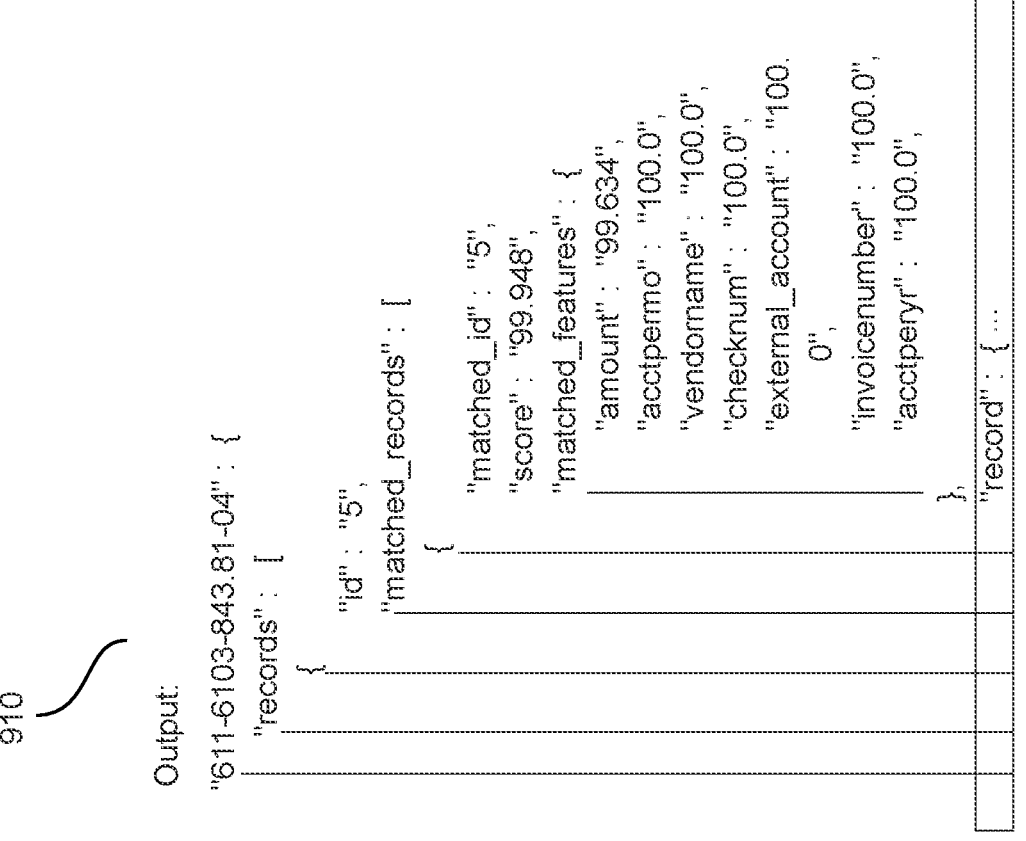

Output:
"611-6103-843.81-04": {
  "records": [
    {
      "id": "5",
      "matched_records": [
        {
          "matched_id": "5",
          "score": "99.948",
          "matched_features": {
            "amount": "99.634",
            "acctpermo": "100.0",
            "vendorname": "100.0",
            "checknum": "100.0",
            "external_account": "100.0",
            "invoicenumber": "100.0",
            "acctperyr": "100.0",
          },
          "record": { ...

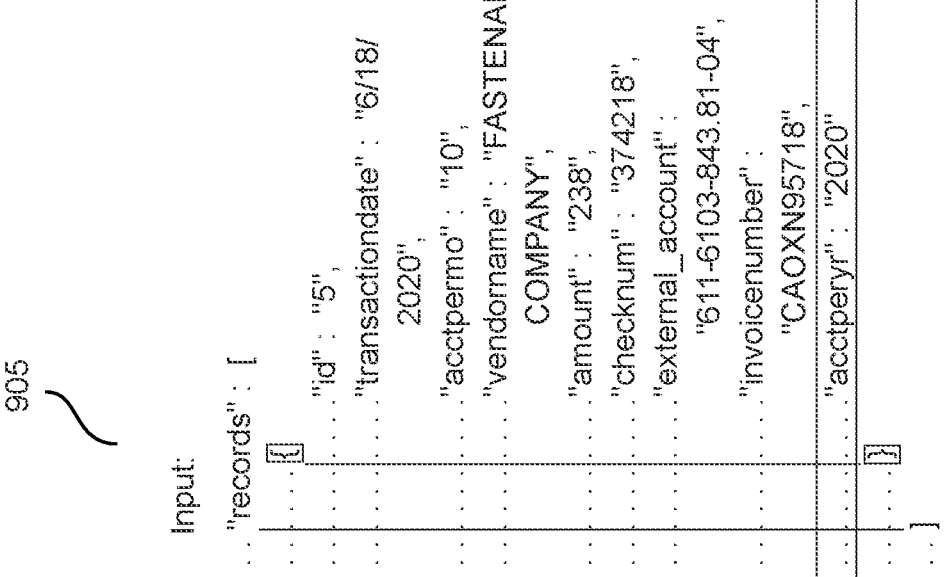

Input:
"records": [
  {
    "id": "5",
    "transactiondate": "6/18/2020",
    "acctpermo": "10",
    "vendorname": "FASTENAL COMPANY",
    "amount": "238",
    "checknum": "374218",
    "external_account": "611-6103-843.81-04",
    "invoicenumber": "CAOXN95718",
    "acctperyr": "2020"
  }
]

Figure 9B:
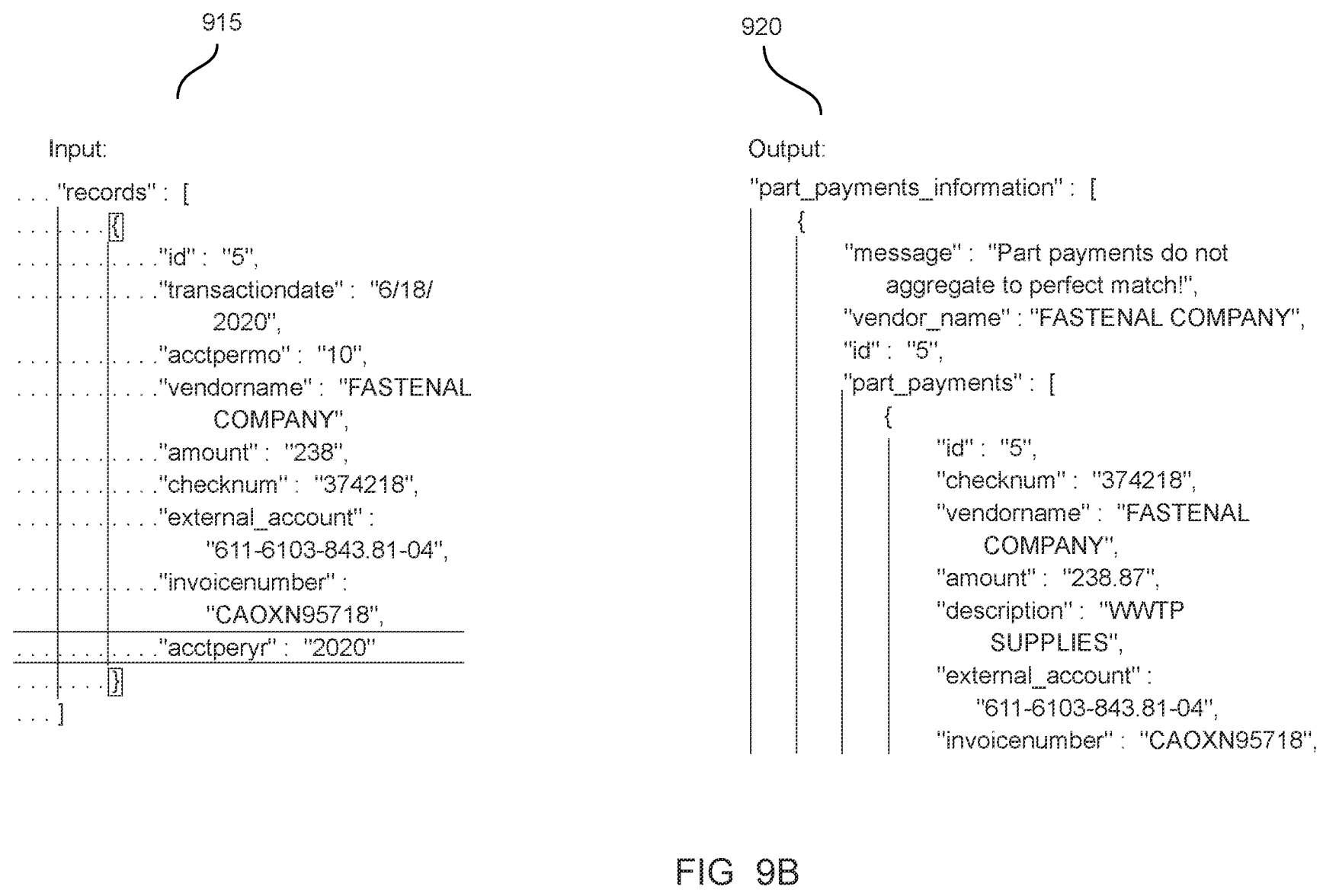

920

Output:
"part_payments_information": [
  {
    "message": "Part payments do not
        aggregate to perfect match!",
    "vendor_name": "FASTENAL COMPANY",
    "id": "5",
    "part_payments": [
      {
        "id": "5",
        "checknum": "374218",
        "vendorname": "FASTENAL
            COMPANY",
        "amount": "238.87",
        "description": "WWTP
            SUPPLIES",
        "external_account":
            "611-6103-843.81-04",
        "invoicenumber": "CAOXN95718",

Input:
"records": [
  {
    "id": "5",
    "transactiondate": "6/18/
        2020",
    "acctpermo": "10",
    "vendorname": "FASTENAL
        COMPANY",
    "amount": "238",
    "checknum": "374218",
    "external_account":
        "611-6103-843.81-04",
    "invoicenumber":
        "CAOXN95718",
    "acctperyr": "2020"
  }
]

1100

SYSTEM AND METHOD FOR AUTOMATIC RECONCILIATION OF DATA

FIELD

The present disclosure relates generally to data reconciliation, and more particularly, to a reconciliation engine and data reconciliation techniques that partially use machine learning and natural language processing techniques to overcome challenges associated with traditional manual reconciliation engines and data reconciliation techniques without compromising the accuracy and handle the complexity of the features.

BACKGROUND

Data reconciliation is a process of comparing data from two or more sources to ensure accuracy and completeness. Data reconciliation can be broken down into two main categories: system-level and transaction-level. System-level data reconciliation involves comparing two systems to identify data discrepancies, such as differences in values or records. Transaction-level data reconciliation involves comparing transactions between two systems to ensure accuracy and completeness. Data reconciliation can be used in many different scenarios, including accounting, financial reporting, manufacturing processes, energy management systems, and IT infrastructure.

The process typically begins by looking at the differences between the two sets of data and attempting to explain them. This can involve researching external sources, such as industry standards or guidelines, to provide an explanation for the discrepancies. Once the differences have been identified, they must be resolved by either adjusting one of the datasets or combining the data sets into a single source. Finally, the results are checked to ensure accuracy and completeness. This ensures that all datasets are in agreement and that data is accurate and up-to-date. The process of data reconciliation can help reduce errors, improve accuracy, increase efficiency and improve decision-making. It can also provide valuable insights into sources of data and be used as a tool for detecting fraud or potential errors.

SUMMARY

Techniques disclosed herein relate generally to data reconciliation. More specifically and without limitation, a reconciliation engine and data reconciliation techniques that partially use machine learning and natural language processing techniques to overcome challenges associated with traditional manual reconciliation engines and data reconciliation techniques without compromising the accuracy and handle the complexity of the features. The reconciliation engine and data reconciliation techniques described herein provide an automated generic solution with improved efficiency and reduced human intervention by incorporating machine learning procedures into the solution. Various embodiments are described herein to illustrate various features. These embodiments include various methods, systems, non-transitory computer-readable storage media storing programs, code, or instructions executable by one or more processors, and the like.

In various embodiments, a computer-implemented method is provided that includes accessing a source and target table; performing intra-reconciliation on the source table; grouping the source and target table based on system configurations; reconciling data is iterated over each group, wherein the reconciling data comprises: finding, using a machine learning model, a closest match for each group; identifying any partial payments for each group; and summing the partial payment amounts to obtain a summed amount for each group and checking whether the summed amount is equal to an amount of a source table record; and outputting the closest match for each group and a result of checking whether the summed amount is equal to the amount of the source table record for each group.

In some embodiments, when the summed amount is equal to the amount of the source table record within a predefined tolerance limit, the summed amount is considered as a part payment or aggregation, or else the partial payment amounts do not aggregate up to a match with the amount of the source table record.

In some embodiments, the machine learning model uses a k-nearest neighbors algorithm to find similarities between new record data in the source table and existing available records in the target table.

In some embodiments, finding the closest match comprises: generating a scoring vector for a single record, finding a mean of all feature values to get a similarity index, sorting mean scores corresponding to each record, and fetching the best matches based on top relative score.

In some embodiments, the computer-implemented method further comprises determining whether multiple column mapping is on as a user system configuration; and when multiple column mapping is on performing the following subprocess: checking a data type of each column; determining whether the data type is a string type; when the data type is string: identifying N-grams of a source table record value; forming N-grams pairs from a target table record description; calculating a Levenshtein distance for each N-gram; fetching a maximum score; and inputting the maximum score into the machine learning model to find a closest match.

In some embodiments, when the data type is not string: creating a string from a source table record; subtracting the created string from a target table description; dropping all alphabets; typecasting the string to an integer; calculating a relative difference; and inputting the relative difference into the machine learning model to find a closest match.

In some embodiments, the outputting comprises displaying in a graphical user interface the closest match for each group and the result of checking whether the summed amount is equal to the amount of the source table record for each group.

In various embodiments, a system is provided that includes one or more processors and one or more computer-readable media storing instructions which, when executed by the one or more processors, cause the system to perform part or all of the operations and/or methods disclosed herein.

In various embodiments, one or more non-transitory computer-readable media are provided for storing instructions which, when executed by one or more processors, cause a system to perform part or all of the operations and/or methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 3B shows an API mode of the reconciliation engine in accordance with various embodiments.

FIG. 6 illustrates preemptive reconciliation in accordance with various embodiments.

FIG. 7A illustrates use of a key in invoice and payment tables in accordance with various embodiments.

FIG. 7B shows a system configuration file in accordance with various embodiments.

FIGS. 8A-8C illustrate grouping of similar transactions or records of source and target tables in accordance with various embodiments.

FIG. 9A shows the input and output of a partial match subprocess for reconciliation of data in accordance with various embodiments.

FIG. 9B shows the input and output of a aggregation subprocess for reconciliation of data in accordance with various embodiments.

DETAILED DESCRIPTION

Figure 1:
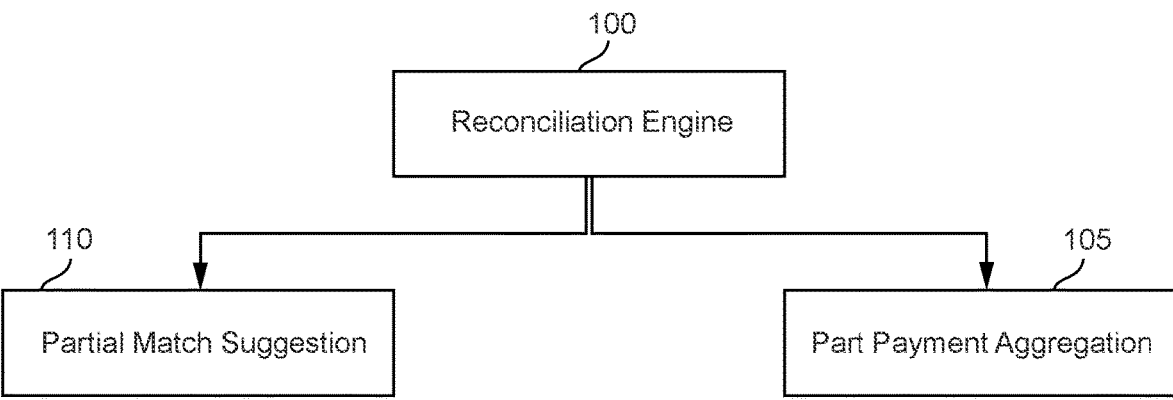
FIG. 1 illustrates functionality of a reconciliation engine in accordance with various embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

INTRODUCTION

Data reconciliation is a huge problem in many industries, it can lead to delayed realization, subpar customer experience, loss of customers or vendors, etc. It is also a computationally expensive process while being performed on a huge amount of data. For example, in the specific context of transaction-level data reconciliation for businesses, reconciliation is an essential and critical process that helps users manage business operations including management of finances. Transaction-level data reconciliation can be thought of as an accounting process of matching transactions between two sets of records to ensure the records are matching. The idea is to match up the source data with the target data.

Transaction-level data reconciliation may be carried out using a manual approach. This approach is used by many domains where reconciliation is done manually. This approach is exceptionally time-taking and prone to error due to human negligence. This also doesn't scale for users such as enterprise customers that have a huge dataset. Transaction-level data reconciliation may also be carried out using a comparison-based approach. This approach has a limitation as multiple columns need to be compared iteratively. This works on a reconciliation engine with a fixed schema but requires a lot of rework when the schema is changing. Lastly, transaction-level data reconciliation may be carried out using a rigid, non-flexible, rule-based approach. By automating the repetitive steps with some user-defined matching rules, the drawbacks of the traditional manual approach got reduced to some extent. But these ETL tools become inefficient when applied to a new dataset because it needs a lot of reengineering work to adapt to a new business rule provided by the user. All these approaches have issues in terms of scalability, space and time complexity. Moreover, they offer little to no carry-over to other use-cases.

In order to overcome these challenges and others, the present disclosure describes a reconciliation engine and data reconciliation techniques that partially use machine learning and natural language processing techniques to overcome challenges associated with traditional manual reconciliation engines and data reconciliation techniques without compromising the accuracy and handle the complexity of the features. The reconciliation engine and data reconciliation techniques described herein are domain agnostic: even though the reconciliation engine and data reconciliation techniques are described and applied herein in the context of the Financial and Banking Industry (particularly with respect to payment reconciliation, which is a huge problem in the financial industry), the same reconciliation engine and data reconciliation techniques can be extended to other domains also where transaction-level data reconciliation needs to be performed. Most of the popular reconciliation frameworks are dependent on a particular industry. But the proposed framework can tackle any industry data because the underlying machine learning and natural language processing techniques used in the pipeline are not industry specific.

In one particular aspect, a computer implement method is provided that comprises: accessing a source and target table; performing intra-reconciliation on the source table; grouping the source and target table based on system configurations; reconciling data is iterated over each group, wherein the reconciling data comprises: finding, using a machine learning model, a closest match for each group; identifying any partial payments for each group; and summing the partial payment amounts to obtain a summed amount for each group and checking whether the summed amount is equal to an amount of a source table record; and outputting the closest match for each group and a result of checking whether the summed amount is equal to the amount of the source table record for each group.

Advantageously, the reconciliation engine and data reconciliation techniques described herein can handle massive amounts of data with increasing complexity easily. Due to the digitization of financial domains, data is growing exponentially and becoming complex as well. The reconciliation engine and data reconciliation techniques can detect and exploit the underlying pattern within complex data and analyzes the likely matches across the dataset. Further, the reconciliation engine and data reconciliation techniques accelerate the process and reduce the time significantly. This automated approach has lessened the repetitive, costly, and rigid rule-based iterations. Filtering based on key provided by domain expert via system configuration, and intra-reconciliation components in the described system design will be very useful from this perspective. Further, the reconciliation engine and data reconciliation techniques minimize errors in manual reconciliation. One of the prime objectives of this approach is to alleviate the task from human efforts. The system can be used as a straight through processing system or can aid humans to make informed decisions. Finally, with respect to particular to payment reconciliation, the reconciliation engine and data reconciliation techniques achieve aggregation via part payments. Many times, invoices are paid back in smaller amounts. The system and approaches herein try to aggregate the smaller part payments and checks if they add up to the invoice amount.

Problem Context

The reconciliation engine uses machine learning techniques that come in handy because it has the power to match records using natural language processing, handle repetitive tasks easily and make the process automated. It is also agnostic to data size and can scale a huge dataset.

For the reconciliation engine to work it uses two sets of data:

1. Source table: Transactions to reconcile i.e., the table for which the system looks up for the closest match in target table data.
2. Target table: Transactions to reconcile with i.e., the table where the system looks up for the matches.

For example, consider two tables:

1. Invoice table: Table containing the data for which payments are received.
2. Payments table: Table containing the data for which invoices are raised by the party providing the services.

Any of these tables can be considered as the source table and the other as the target table. To explain the problem context, the invoice table and the payments table are considered as the source and the target table here respectively.

They can also be used in a reverse manner if needed. The idea is to match up the invoices with the payments made by the users such as customers.

As shown in FIG. 1, the reconciliation engine 100 tries to accomplish the following objectives:

1. Potential Aggregation 105 (as part of part payments):
   a. In the financial industry and other domain spaces, there are scenarios when payments are made in small parts (i.e., part payment). Reconciling these types of records are very crucial to check if an invoice is paid back through part payments. Aggregation is introduced here to achieve the same.
   b. This feature tries to aggregate the part payment records based on the amount and checks if it adds up to the invoice amount. If the aggregation matches the invoice amount it can be considered an exact match of part payment. Otherwise, it shows part payments do not aggregate up to an exact match.
   c. Tolerance can also be set in the system configurations; this allows the user to counter the rounding-off error and minor differences in amounts. For example, let's suppose the difference between the sum of part payments and the invoice amount is 0.69. Now a tolerance of 1 ($<=1$) can be set and consider 0.69 as 0 (i.e., no difference). This is a user-configurable feature.
2. To find the top matching suggestions 110 (Partial match):
   a. The system looks for top-N closest matches in the payment table for the invoice records using a k-nearest neighbors algorithm (KNN). These top-matched records are called partial matches. Computationally, the KNN assigns a match score to each payment record based on how close it is to the respective invoice. The relative match scores can be sorted further to find the closest partial matches. A threshold can also be introduced to filter the top desired records.
   b. When an exact match (i.e., all the features are the same and the match score is 100.0) is found that is called a perfect match. Users can opt to provide a match feature which may increase the throughput of the engine via configurations.

For example to understand the problem consider the following:

| | | | Invoice table: | | | |
|---|---|---|---|---|---|---|
| ID | DATE | CHECK_NUM | CUSTOMERNAME | AMOUNT | INVOICE_NUM | ACCOUNT_NUM |
| 34 | Oct. 12, 2021 | MTN3011209 | MARC VENDOR | 1000 | CAOXN95718 | EXT631630504 |
| 36 | Sep. 20, 2020 | ITR45369876 | MONARCH | 5002 | ZYTOT376486 | EAM34572834 |
| 37 | Aug. 23, 2020 | ITR30478269 | VENDOR | 4000 | XMLTN453768 | XM457964427 |

Payments table:

| ID | TRANSACTION_DATE | CHECK_NUM | CUSTOMERNAME | AMOUNT | INVOICENUMBER | ACCOUNT_NUMBER | NARRATION |
|---|---|---|---|---|---|---|---|
| 60 | Nov. 13, 2021 | MTN3011210 | MARC VENDO | | CAOXN95720 | EXT631630504 | Payment for CAOXN95718 of rs 600 |
| 61 | Nov. 13, 2021 | MTN3011210 | MAC VENDOR | | CAOXN95720 | EXT631630504 | Payment for CAOXN95718 of Rs 6000 |
| 62 | Nov. 13, 2021 | MTN3011210 | MARC ENDOR | | CAOXN95720 | EXT631630504 | Payment for CAOXN95718 of Rs 1600 |
| 63 | Nov. 13, 2021 | MTN3011210 | | 300 | CAOXN95720 | EXT631630504 | Payment for MARC VENDOR with account CAOXN95718 |
| 64 | Dec. 30, 2020 | ITR45369878 | MONARCH | 4000 | ZYTOT376487 | EAM34572834 | |
| 65 | Dec. 31, 2020 | ITR45369879 | MONARCH | 1000 | ZYTOT376488 | EAM34572834 | |
| 66 | Aug. 23, 2020 | ITR30478270 | VENDO | 4000 | XMLTN453768 | XM457964427 | |
| 67 | Aug. 23, 2020 | ITR30478270 | VENDRO | 4000 | XMLTN453768 | XM457964427 | |

By referring to the two tables shown above following are the scenarios that can be detected:

1. Column names between two tables are not similar or same.
   a. Here it can be seen that the columns between two tables do not have a one to one mapping. For instance: the column is named as "Date" in "Invoice Table" whereas the date column in "Payments Table"" is referred to as "Transaction Date".
   b. This problem can be overcome by using the system's configuration file. The file allows for mapping columns from "Invoice Table" to "Payments Table". The system's configuration file ids described in further detail herein. Moreover, the same problem is explained below with example.
2. Values from different cells of the payment tables are missing, but available in narration section:
   a. Looking at the "Payments Table" the record with "ID=60", the amount cell is "NULL", and the same amount is written in the "Narration" column of same record in the "Payments Table".
   b. This is addressed by creating a one-to-many column mapping/multi-column matching between "Invoice Table" and "Payment Table". In the above-mentioned example, a mapping of "Amount"" from "Invoice Table" to "Amount" and "Narration" of "Payment Table" is created.
3. The AMOUNT between records of two table may have a small/negligible difference or rounding-off:
   a. In the "Invoice Table" there is an "Amount" of "Rs 5002" with record "ID=36", the payment for the same invoice has been made in two parts, i.e., "Amount=Rs 4000" and "Amount=Rs 1000" with record ID "64" and "65" in payment table. Since the amounts differ by a small margin. A simple comparison would not be able to effectively compare these records.
   b. This can be addressed by setting a "tolerance" factor in the system's configuration file. Which would allow small amount of difference in numerical values based on user's need.
4. Spelling Error: Sometimes some textual/categorical cells may have error in their spellings or may have missing/additional characters:
   a. In the payment table, there are two records with "ID=66 and 67", which have a spelling mistake in their "CustomerName" column, i.e. "VENDO" and "VENDRO". This would again raise the issue of in-effective comparison during the simple comparison of strings.
   b. This is addressed by using a natural language processing (NLP) based technique which provides a similarity score, which helps to match these two payment records with the invoice record with "ID=37", where the "CustomerName" is "VENDOR"

The reconciliation engine and data reconciliation techniques (algorithm) comprise the below service or subsystems:

1. Filter and group the transactions to reconcile with (to group the similar transactions):
   a. Filtering and grouping helps to reduce the search space and the expensive repetitive loops.
2. Perform KNN to find k number of closest matches to the transaction:
   a. KNN is used here to find the top matching records; however, it should be understood that other clustering algorithms may be used without departing from the spirit and scope of the present disclosure. KNN helps to find a perfect match as well as a partial match based on a scenario for a record to reconcile.
   b. The k nearest neighbors are calculated based on a relative scoring between the transactions in the above two tables. The relative scoring method is described in the design component section in more detail.

The Step-by-Step Process for Multi-Column Matching is Explained Below with the Examples:

Often times the end user who is making payments prefers to omit specific fields and rely on the transaction narration/description section to fill out the specific fields of the transaction itself. This raises an issue during the reconciliation process as the corresponding fields in the payment table can be missing. By using multi-column matching it is possible to address this issue. Below are two examples that explain two scenarios where a numerical data type and string data type are missing from their respective places but are present in the narration of the payment table.

Case 1: "AMOUNT" value is missing (or any numerical value). But available in "NARRATION" column in payment table.

Invoice Table

| ID | DATE | CHECK_NUM | CUSTOMERNAME | AMOUNT | INVOICE_NUM | ACCOUNT_NUM |
|----|------|-----------|--------------|--------|-------------|-------------|
| 34 | Oct. 12, 2021 | MTN3011209 | MARC VENDOR | 1000 | CAOXN95718 | EXT631630504 |

Payment Table

| ID | TRANSACTION_DATE | CHECK_NUM | CUSTOMERNAME | AMOUNT | INVOICE NUMBER | ACCOUNT_NUMBER | NARRATION |
|----|------------------|-----------|--------------|--------|----------------|----------------|-----------|
| 60 | Nov. 13, 2021 | MTN3011210 | MARC VENDO | | CAOXN95720 | EXT631630504 | Payment for CAOXN95718 of Rs 600 |
| 61 | Nov. 13, 2021 | MTN3011210 | MAC VENDOR | | CAOXN95720 | EXT631630504 | Payment for CAOXN95718 of Rs 6000 |
| 62 | Nov. 13, 2021 | MTN3011210 | MARC ENDOR | | CAOXN95720 | EXT631630504 | Payment for CAOXN95718 of Rs 1600 |

Configuration to handle this may look like the following:

```
{
"multicolumn": [
    {
      "status": "yes",
      "feature name": "AMOUNT",
      "matched_feature_name_with_columns": ["AMOUNT", "NARRATION"]
    }
  ]
}
```

Step 1: Create string from invoice record and payment record (including only numerical and text features)

Invoice string: "MTN3011209 MARC VENDOR CAOXN95718 EXT631630504"

Note that "amount" in invoice string is not included.

Payment.Narration: "Payment for CAOXN95718 of Rs 600"

Step 2: Subtraction of invoice_string from payment.narration. This will ensure that all the fields are removed from the payment.narration except the missing field, i.e., "amount". Note that adding the amount to the invoice string is skipped.

1. Payment.Narration: "Payment for CAOXN95718 of Rs 600"

2. Invoice string: "MTN3011209 MARC VENDOR CAOXN95718 EXT631630504"

3. New_Payment.Narration: "Payment for of Rs 600"

String Subtraction:

String subtraction is a multi-step process, where words are tokenized based on a delimiter then find intersection and then subtract the intersection from Payment.Narration. Following are the steps.

1. Tokenize the invoice string and payment.Narration into words and convert to sets.

a. Payment.Narration: "Payment for CAOXN95718 of Rs 600".

b. Payment.Narration after tokenization=SET{"Payment", "for", "CAOXN95718", "of", "Rs", "600"}.

c. Invoice String: "MTN3011209 MARC VENDOR CAOXN95718 EXT631630504"

d. Invoice String after tokenization=SET{"MTN3011209", "MARC", "VENDOR", "CAOXN95718", "EXT631630504"}.

2. Subtract SET{invoice_string} from SET{Payment.Narration}.

a. Remaining_payment.Narration=SET{"Payment", "for", "of", "Rs", "600"}.

NOTE: String subtraction ASSUMES that the spellings are correct. In case spellings are incorrect, this could cause conflicts in the extraction of the entity from Payment.Narration Step 3: Dropping all alphabets from the string.

1. New_Payment.Narration: "Payment for of Rs 600".

2. Num_payment_narration: "600".

3. NOTE: if the narration string becomes empty, this indicates there is no amount (or numerical) field in the narration.

Step 4: Typecast sting to integer and assign

1. Payment. Amount=600.

2. In the same way, the "AMOUNT" column value (i.e., Rs 6000 & 1600) can be obtained for the payment record with ID 61 & 62.

Case 2: "CUSTOMERNAME" value is missing (or any string/text value). But available in "NARRATION" column in payment table.

Invoice Table

| ID | DATE | CHECK_NUM | CUSTOMERNAME | AMOUNT | INVOICE_NUM | ACCOUNT_NUM |
|----|------|-----------|--------------|--------|-------------|-------------|
| 34 | Oct. 12, 2021 | MTN3011209 | MARC VENDOR | 1000 | CAOXN95718 | EXT631630504 |

Payment Table

| ID | TRANSACTION_DATE | CHECK_NUM | CUSTOMERNAME | AMOUNT | INVOICE NUMBER | ACCOUNT_NUMBER | NARRATION |
|----|------------------|-----------|--------------|--------|----------------|----------------|-----------|
| 60 | Nov. 13, 2021 | MTN3011210 | | 300 | CAOXN95720 | EXT631630504 | Payment for MARC VENDOR with account CAOXN95718 |

Configuration to handle this may look like the following, note that the bold fonts are the configuration required for this specific use-case.

```
{
"multicolumn": [
  {
      "status": "yes",
      "feature name": "AMOUNT",
      "matched_feature_name_with_columns": ["AMOUNT", "NARRATION"]
  },
  {
    "status": "yes",
    "feature_name": "CUSTOMERNAME",
    "matched_feature_name_with_columns":["CUSTOMERNAME","NARRA-
TION"]
    }
  ]
}
```

Step 1: Identify missing field in payment record.
1. In this case it is "CUSTOMERNAME" Step 2: Identify N-grams of "CUSTOMERNAME" from invoice record.
1. N-Grams=tokenize_word (invoice.CUSTOMER-NAME)
2. In this case: N-Grams=2 because "MARC VENDOR" is two tokens
3. N-GRAM is an NLP pre-processing technique which is used to capture subsequent token from a text sample as per the application or use-case. Here "N" stands for the number of subsequent tokens required for the use case.
4. Its primary use is to capture the relation between "N" subsequent words.
Step 3: Form N-Gram pairs from payment.NARRATION.
1. Narration="Payment for MARC VENDOR with account CAOXN95718".
2. N-Gram_pairs="Payment for" "for MARC" "MARC VENDOR" "VENDOR with" "with account" "account CAOXN95718".

Step 4: Calculate Levenshtein Distance between invoice. CUSTOMERNAME and every N-Gram pair generated from narration.

1. Match>90% between string matching denotes payment. CUSTOMERNAME was found in payment. NARRATION
2. In this case "MARC VENDOR" will be a perfect match.
3. Note: If the string matching with pairs does not return a match above the threshold, either the CUSTOMERNAME is not present in the narration or the spelling is too different/incorrect to return a similarity result.

Following are the Steps to Show how KNN is Used to Find Nearest Neighbors Best Partial Matches:

Considering the invoice and payment tables do not have any null values since they have already passed through multi_column matching process as explained above.

| | | | Invoice Table | | | |
|---|---|---|---|---|---|---|
| ID | DATE | CHECK_NUM | CUSTOMERNAME | AMOUNT | INVOICE_NUM | ACCOUNT_NUM |
| 34 | Oct. 12, 2021 | MTN3011209 | MARC VENDOR | 1000 | CAOXN95718 | EXT631630504 |

| | | | Payment Table | | | | |
|---|---|---|---|---|---|---|---|
| ID | TRANSACTION_DATE | CHECK_NUM | CUSTOMERNAME | AMOUNT | INVOICENUMBER | ACCOUNT_NUMBER | NARRATION |
| 60 | Nov. 13, 2021 | MTN3011210 | MARC VENDO | 800 | CAOXN95720 | EXT631630504 | Payment for CAOXN95718 of Rs 800 |
| 61 | Nov. 13, 2021 | MTN3011210 | MAC VENDOR | 6000 | CAOXN95720 | EXT631630504 | Payment for CAOXN95718 of Rs 6000 |
| 62 | Nov. 13, 2021 | MTN3011210 | MARC ENDOR | 1600 | CAOXN95720 | EXT631630504 | Payment for CAOXN95718 of Rs 1600 |

A relevant part of configuration file is shown here:

```
{
  "K-Neighbors": 5,
  "source_target_column_mapping": [
    {
      "DATE": ["TRANSACTION_DATE"],
      "ACCOUNTNUMBER": ["ACCOUNT_NUM", "ACCOUNT_NUMBER"],
      "INVOICENUMBER": ["INVOICE_NUM"]
    }
  ]
}
SOURCE(INVOICE) => TARGET(PAYMENT)
ID => ID
DATE => TRANSACTION_DATE
CHECK_NUM => CHECK_NUM
CUSTOMERNAME => CUSTOMERNAME
AMOUNT => AMOUNT
INVOICE_NUM => INVOICENUMBER
ACCOUNT_NUM => ACCOUNT_NUMBER
```

Step 1: Refer to column_mapping from system's configuration.

Step 2: Drop the unique category column and datetime columns since comparing them does not add any value. Thus, dropping "ID" and invoice.DATE and payment.TRANSACTION_DATE Step 3: Calculate column-wise relative similarity to form a similarity vector.

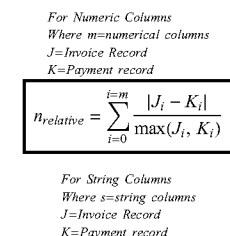

For Numeric Columns
Where m=numerical columns
J=Invoice Record
K=Payment record $$n_{relative} = \sum_{i=0}^{i=m} \frac{|J_i - K_i|}{\max(J_i, K_i)}$$

For String Columns
Where s=string columns
J=Invoice Record
K=Payment record $$str_{relative} = \sum_{i=0}^{i=s} \frac{\text{Levenshtein}(J_i, K_i)}{\text{length}(\max(J_i, K_i))}$$

-continued

Relative Distance $$d_{relative} = \frac{n + str}{m + s}$$

The first equation is to calculate the relative difference between the respective numerical columns. So, the value of J and K would be the corresponding numerical column values of the source and target table record. In this example, Invoice.AMOUNT and Payment.AMOUNT are considered as the feature values i.e., J and K respectively in the first equation as shown in the below calculation.

Numerical:

For all the numerical columns (e.g., AMOUNT), calculate the relative difference between the respective columns and generate a score for that column.

1. Invoice.AMOUNT=1000
2. Payment. AMOUNT=800
3. Relative_difference=|(1000–800)/1000| (this value is always positive)
4. Relative_difference=0.20
5. Similarity=(1–0.20)*100=80%

The second equation is to calculate the relative difference between the respective string columns using Levenshtein distance. So, the value of J and K would be the corresponding string datatype column values of the source and target table record. In this example, Invoice.CUSTOMERNAME and Payment. CUSTOMERNAME are considered as the feature values i.e., J and K respectively in the second equation as shown in the below calculation.

String:

For all the string/text columns (e.g., CUSTOMERNAME), calculate the relative Levenshtein distance between the respective columns and generate the feature score of that column.

1. Invoice.CUSTOMERNAME=MARC VENDOR
2. Payment. CUSTOMERNAME=MARC VENDO
3. Relative_difference=levenshtein ("MARC VENDOR", "MARC VENDO")
4. Relative_difference=0.090
5. Similarity=(1−0.090)*100=~91%

A scoring vector is the combination of all the relative differences/feature scores calculated for the numerical and string-type columns. In the below similarity vector table, each row represents the scoring vector. For example, the 1st row of the table represents the scoring vector by calculating the relative differences of each column between record id 34 and 60 from the source and target table respectively.

Similarity Vector

| ID | CHECK_NUM | CUSTOMER NAME | AMOUNT | INVOICENUMBER | ACCOUNT_NUMBER |
|----|-----------|---------------|--------|---------------|----------------|
| 60 | 70% | 91% | 80% | 70% | 100% |
| 61 | 70% | 91% | 17% | 70% | 100% |
| 62 | 70% | 91% | 40% | 70% | 100% |

Similarly, calculate the similarity vector for ID 61 and 62 in the payment table against the invoice record with ID 34.

The third equation is used to evaluate the mean/average of the relative differences/feature scores. The parameters n and str are the output of the 1st two equations which are the relative differences of all the numeric and string-type columns respectively. m and s are the total numbers of numeric and string columns present in the records.

Step 4: Calculate overall score.

1. Overall Score=MEAN (similarity score of all columns)
2. Overall Score=82.20%

| ID | OVERALL_SCORE |
|----|---------------|
| 60 | 82.20% |
| 61 | 69.60% |
| 62 | 74.20% |

Step 5: Sort the results to bring the suggestions with best scores to the top:

| ID | OVERALL_SCORE |
|----|---------------|
| 60 | 82.20% |
| 62 | 74.20% |
| 61 | 69.60% |

Accordingly, the difference between each column is represented by the relative difference/feature score. The mean/average of these relative difference/feature scores is called relative score/mean score/relative distance. The scoring vector is the combination of all the relative difference/feature scores for a record.

The Reconciliation Process Using KNN for Obtaining Partial Matches is Complete Now.

Figures 2A, 2B:
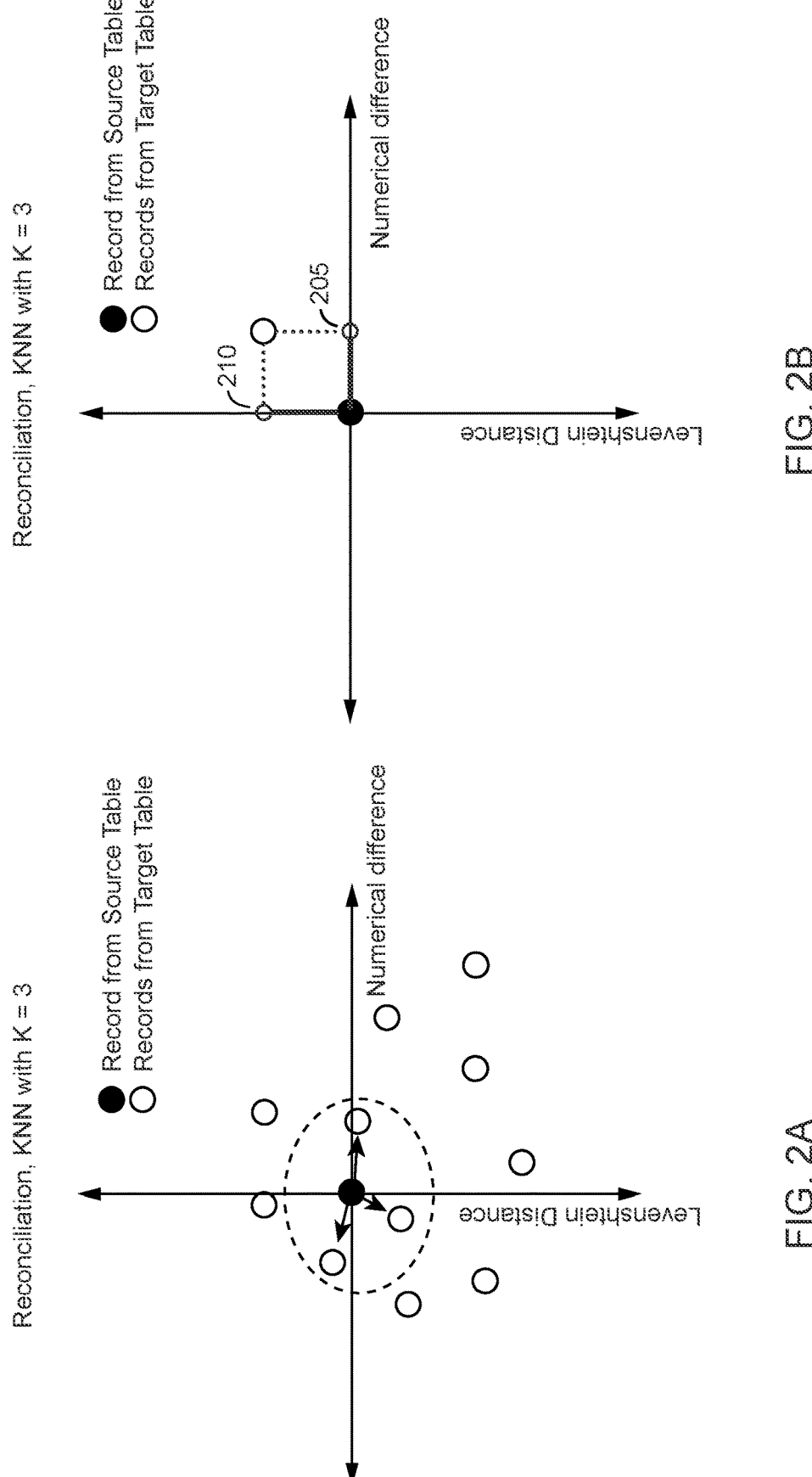
FIGS. 2A and 2B show graphs for partial match using a k-nearest neighbors algorithm in accordance with various embodiments.

In the instance of using KNN as the clustering technique, a source record is being subtracted from the target record in a column-wise fashion (see, e.g., FIG. 2A). Consider the instance where there is only one numerical and one text-based column in source and target tables. Then the column wise difference can be represented as on the graph in FIG. 2B. Note the shortest "Euclidean" distance is not being calculated. Euclidean distance often requires all data to be present in cartesian coordinates. Whereas column-wise distance is simply being calculated based on each feature-column independent from each other. In FIG. 2B, the distance between data points 205 and 210 represents the column-wise distance of a numerical and a text based column respectively. And they are orthogonal/independent from each other. The final score or "overall score" is calculated based on the mean of these feature-column-wise scores. Whereas, the individual score provides interpretability with respect to each feature-column.

Figure 3A:
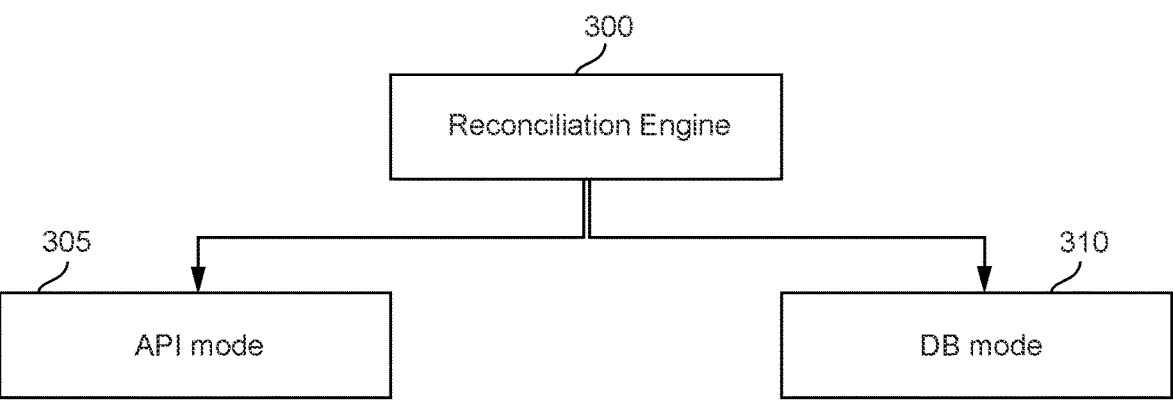
FIG. 3A illustrates modes of a reconciliation engine in accordance with various embodiments.
Figure 3C:
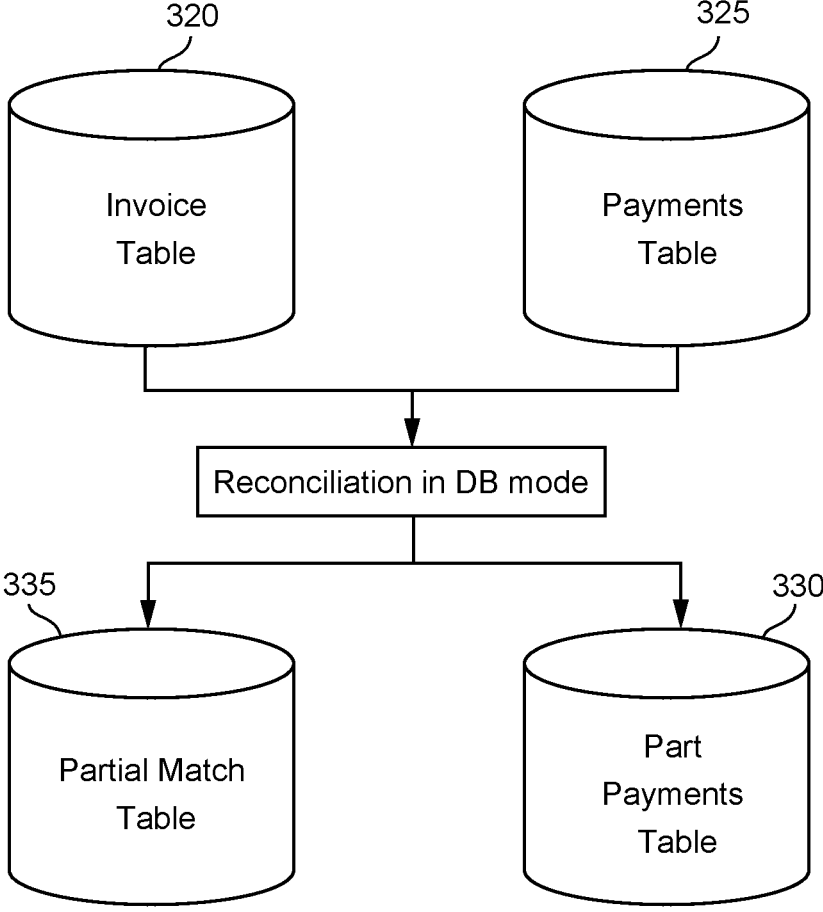
FIG. 3C shows a database mode of the reconciliation engine in accordance with various embodiments.

FIG. 3A shows that the reconciliation engine 300 has two modes of operation for implementing the approaches/techniques described herein:

1. Instance-based API mode 305 (see FIGS. 3A and 3B):
   a. API mode 305 allows users to perform the reconciliation of a particular invoice in a key-value format from any API platform 315 such as "postman". The response is also in a key-value format that contains the top-N best matches including the scores and the part payment information with aggregation.
   b. The response may contain the following information:
      i. n-best matches
      ii. scores corresponding to n-best matches
      iii. was aggregation successful or not
      iv. particulars of part payments that were aggregated
2. Database mode 310 (see FIGS. 3A and 3C):
   a. Database mode 310 allows users to perform reconciliation at scale between tables (e.g., an invoice table 320 and payment table 325). Here, the invoice records are expected to be populated in a table (i.e., invoice table 320). Once the operation is done, the results are stored in two different resultant tables 330; 335 in the database. One resultant table 330 stores all the part payment records and the corresponding invoices. The other resultant table 335 stores all the best matches along with the match scores. This operation is performed in separate batches. This allows data to be matched without being pulled out of the DB, making the entire process very efficient.

Batching:

Loading a huge dataset into memory and performing reconciliation at the same time would be very slow and can occupy a lot of memory due to certain hardware limitations.

Batching or batch processing is a technique that enables the system to break the data into small chunks and do reconciliation. It ensures the performance of the reconciliation engine is consistent for each and every batch. Thus, the efficiency of the module is enhanced. Batching can be done based on any unique feature and the batch size is set as the highest number of records among all the unique account numbers. Both batch size and batching features are user-configurable. This technique is available in the pipeline for both modes.

Key Factors of the Reconciliation Engine and Data Reconciliation Techniques

Figure 4A:
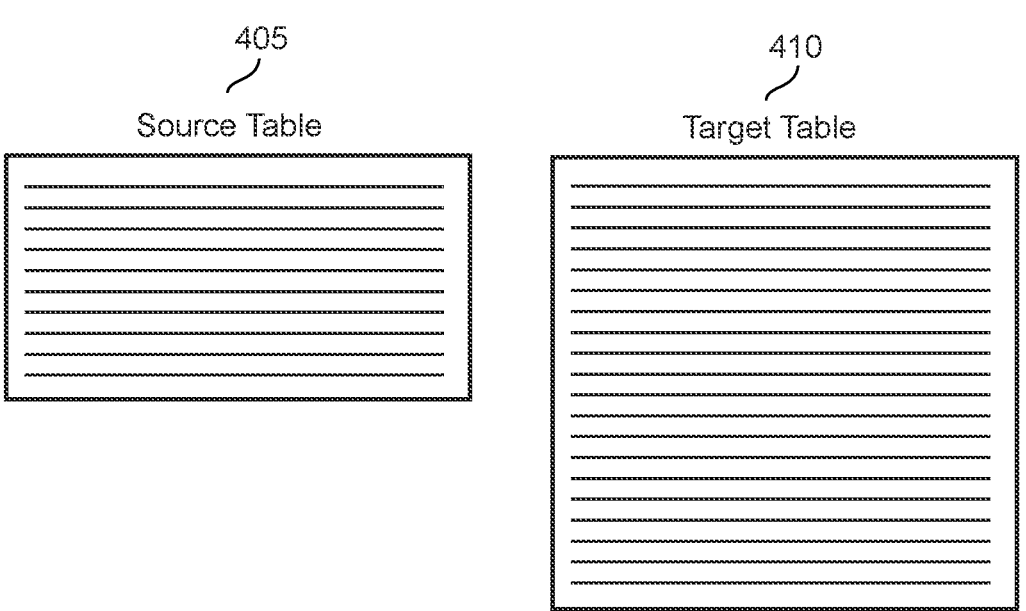
FIG. 4A shows exemplary input data for the reconciliation engine in accordance with various embodiments.

As discussed above, the reconciliation engine works with two sets of data (see, e.g., FIG. 4A).

1. Source table 405: Transactions to reconcile i.e., the table for which system looks up for the closest match in target table data.

2. Target table 410: Transactions to reconcile with i.e., the table where the system looks up for the matches.

Potential aggregation as part of part payments:

1. Aggregation of part payments is a notable feature of the described approaches. Reconciling of the records helps a user to understand if the smaller part payments match up to the invoice amount from the source table.

2. The system aggregates the part payment records based on the amount and checks if it sums up to the invoice amount. If the aggregation matches the invoice amount it is an exact match of the part payment. Otherwise, it shows part payments do not aggregate up to an exact match.

Pre-Emptive Reconciliation:

1. In the data reconciliation techniques, the new transaction in the source table is reconciled within themselves first. Since the search space is drastically smaller compared to the target table this is relatively computationally inexpensive. This will reduce the expensive iteration of reconciliation between the source table and target table in the later stages.

K-Nearest Neighbors-Based Reconciliation (KNN):

1. In this system, the K-Nearest Neighbors technique is being leveraged to find the K-nearest transaction in the target table to that of a transaction in the source table. The K Neighbors are based on the highest matching score from the transaction to be reconciled.

Explainable Feature Score:

1. The top matched records of a source table record are fetched after sorting relative scores. Apart from relative scoring, a feature score is implemented with the system to put an explanation of how the top target table records are picked.

Two-Way Reconciliation (Bi-Directional Reconciliation):

1. The services and subsystems described herein try to reconcile the source table records with the target table as a reference. However, the services and subsystems can also work the other way around i.e., any of the tables can be chosen as source table and the other as target table while running the application.

Figure 4B:
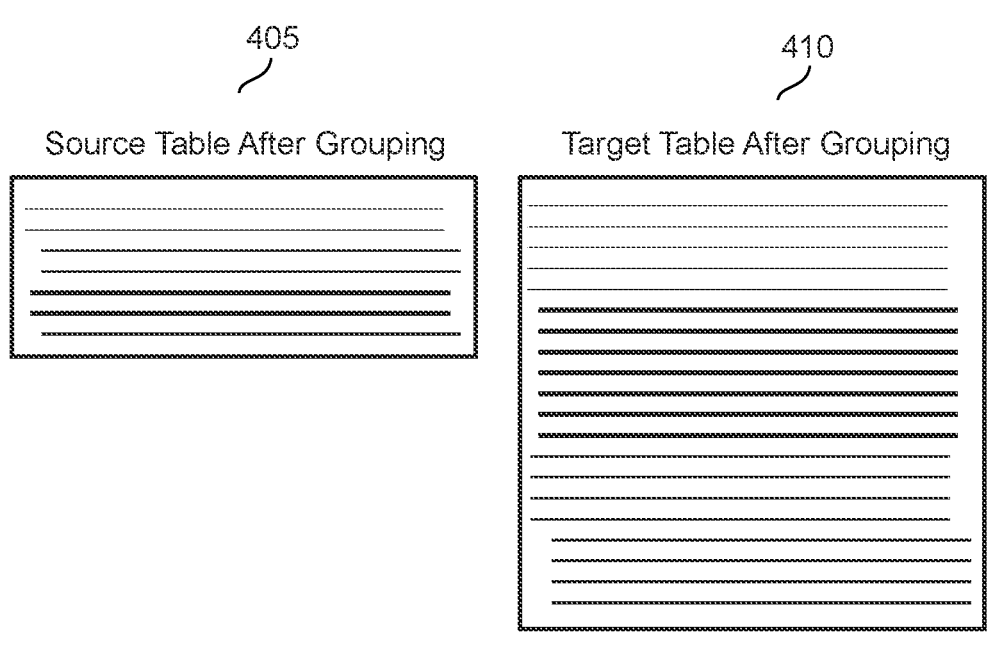
FIGS. 4B and 4C illustrate the advantage of grouping the input data for improved efficiency of the reconciliation engine in accordance with various embodiments.
Figure 4C:
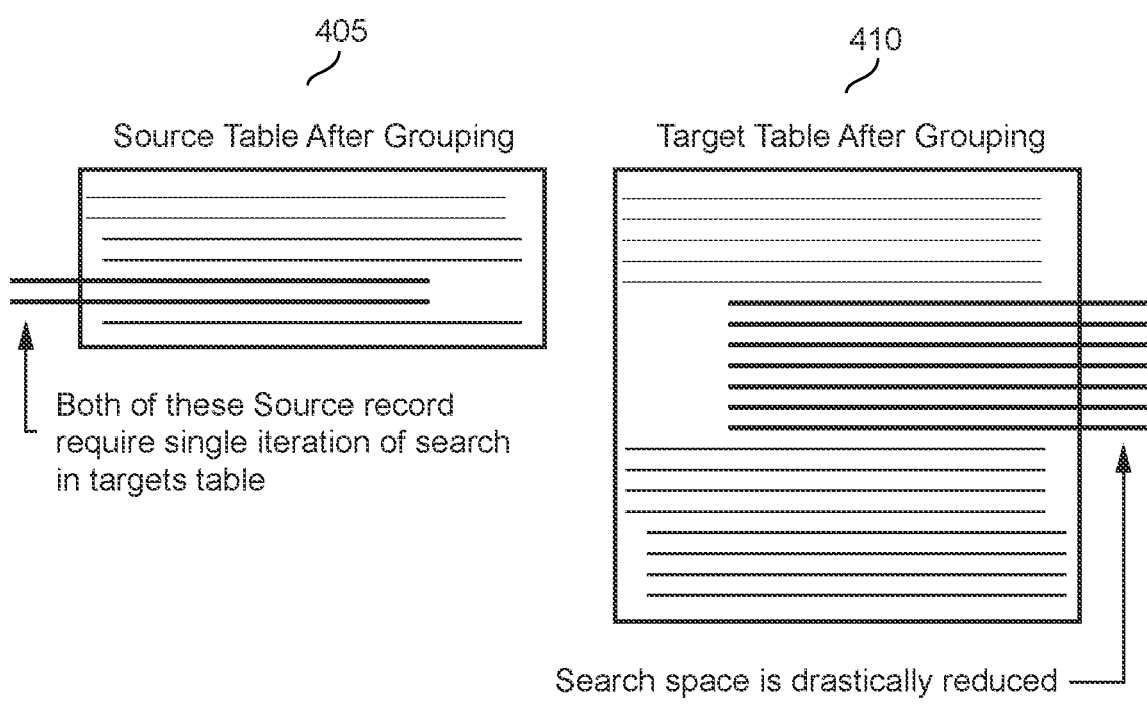

Improved Efficiency:

1. As shown in FIG. 4B, every data point in a source table 405 has to be reconciled with every target table 410 record when grouping is not performed. On the other hand, as shown in FIG. 4C, after grouping source records from the same group, only a single iteration of the search in the target table 410 is required.

2. Thus, the efficiency achieved by this approach is better than the traditional solutions by several orders due to the several optimizations performed in conjunction with each other.

Generalization:

3. Since this approach is not based on any rules. The reconciliation engine works across different use cases in the financial domain and other domains with almost negligible changes in the system's configuration file, which can be easily configured by the user itself.

Workflow

Figure 5:
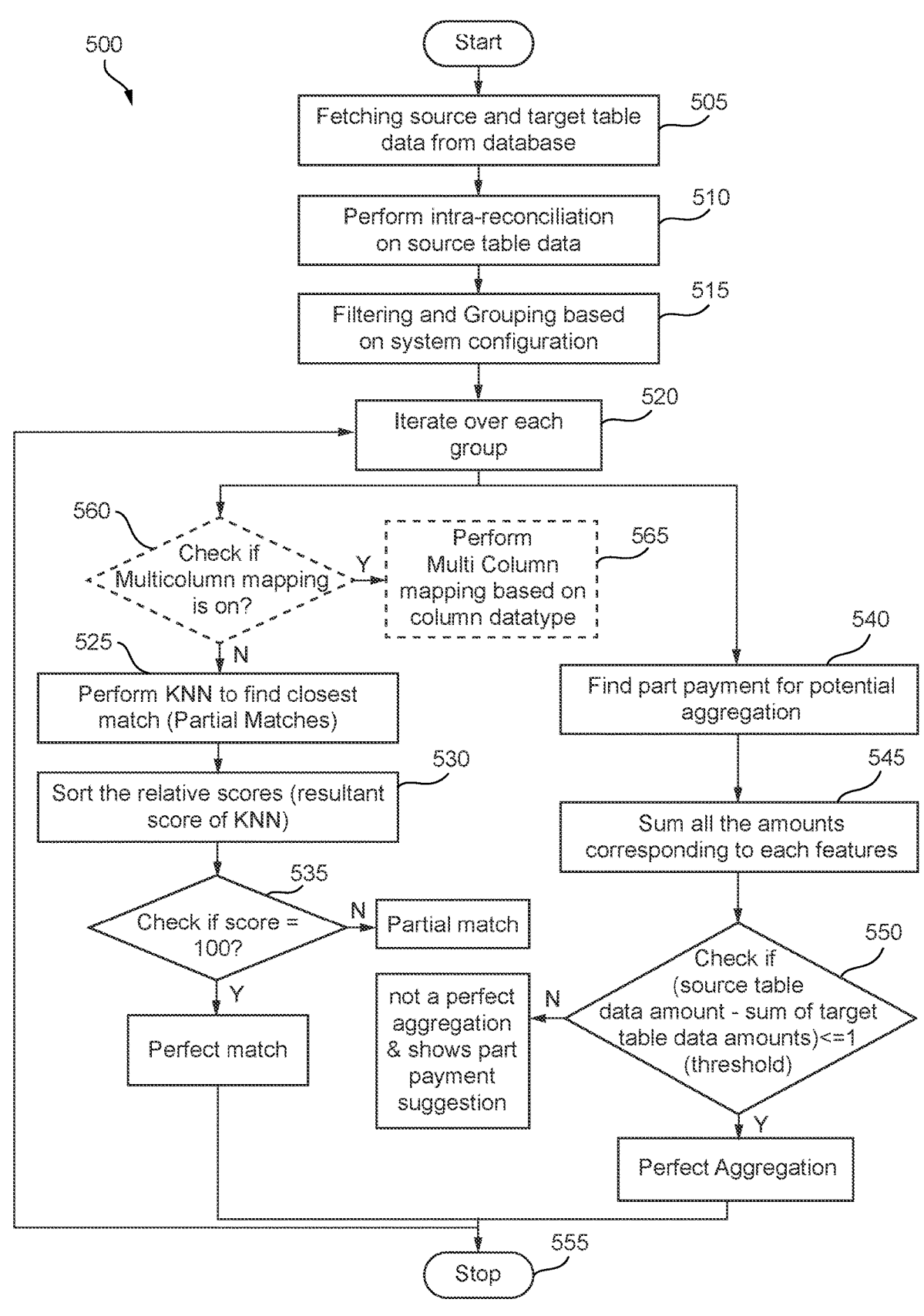
FIG. 5 is a process flow for reconciliation of data in accordance with various embodiments.

FIG. 5 is a flowchart illustrating a process 500 for reconciliation of data in accordance with various embodiments. The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in a different order, or some steps may also be performed in parallel. In certain embodiments, such as in the embodiments depicted in FIGS. 1-4C, the processing depicted in FIG. 5 may be performed by a reconciliation engine (e.g., reconciliation engine 100) to reconcile data.

At step 505, a source and target table data are accessed. For example, source and target table data may be retrieved from a database.

At step 510, intra-reconciliation is performed on the source table data. Intra-reconciliation (also described as preemptive reconciliation) is when data reconciliation is performed inside a table itself. To reduce the iteration between the records of the source and target table, reconciliation can be performed within the source table itself (see, e.g., FIG. 6). Intra-reconciliation may only be performed on the source table since that table is relatively more organized as compared to payments table which contains un-organized data from end user.

Intra-reconciliation may be performed in several ways including one or both of the following:

1. Check for duplicate records in the source table: If all the fields/columns are the same for multiple records, then the duplicates can be removed leaving a single record representative of the duplicate records in the source table.

2. Check for records that are raised by the same customer/account number and can be combined together: If multiple records have similar column/field values other than the amount then the records can be combined into a single record by summing up the amount. For example, the bank has raised two invoices of Rs.800 and Rs.200 for the customer "MARK VENDOR". So, it can be combined into a single record of invoice amount Rs. 1000 (Rs. 800+200) for "MARK VENDOR". Users can also put columns/fields to consider in the configuration file based on their domain knowledge. That way, if mentioned fields are the same for different records, then the amount can be summed up and included as a single record.

At step 515, the source and target table data are filtered and grouped based on system configurations within a system configuration file. The main aim of using the grouping technique is to divide the data into a small group so that similar records belong to the same group and the search space becomes less. Specifically, the grouping comprises dividing the data into small groups based on a key (user-configurable). The system tries to perform grouping on both the source and target table based on the key. For example, the key can be a column/field name of the records. Data with the same key-value (e.g., column value) belongs to the same group. The filtering is part of the grouping and occurs based on the key. Take for example, the source and target table data shown in FIG. 7A. Here the key is "account_num" which is a column name in the source table and the same can be mentioned in the configuration file. This key helps the system to filter and group the data under the same "account_num". The record with Id 34 from the invoice table and the records with id 60,61,62,63 from the payment table have a same "account_num". Thus, these records belong to the same group. Reconciliation can be performed now on top of this. There can be thousands of records under the same group, and among them, top matches should be found.

Figure 8A:
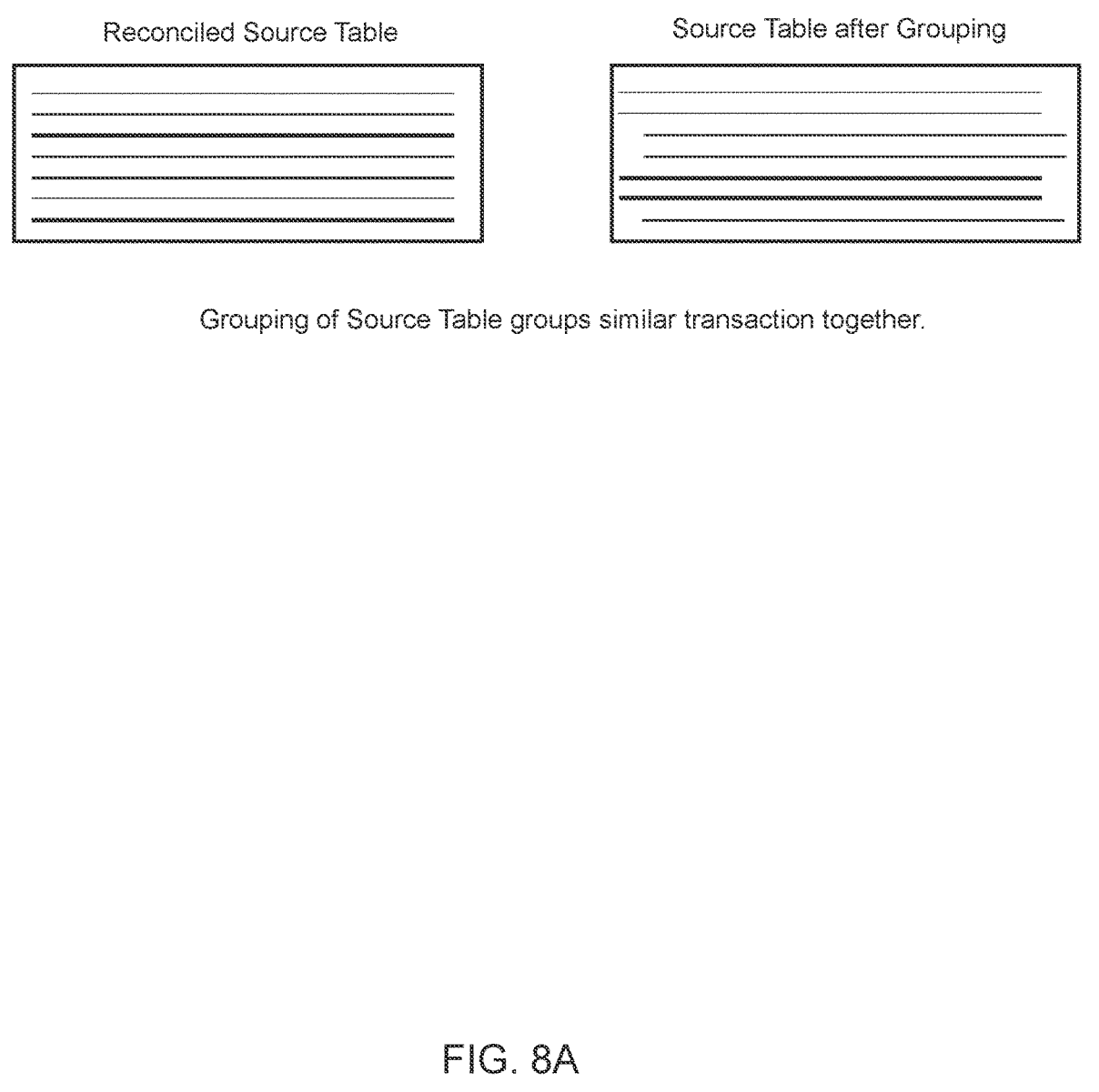
Figure 8B:
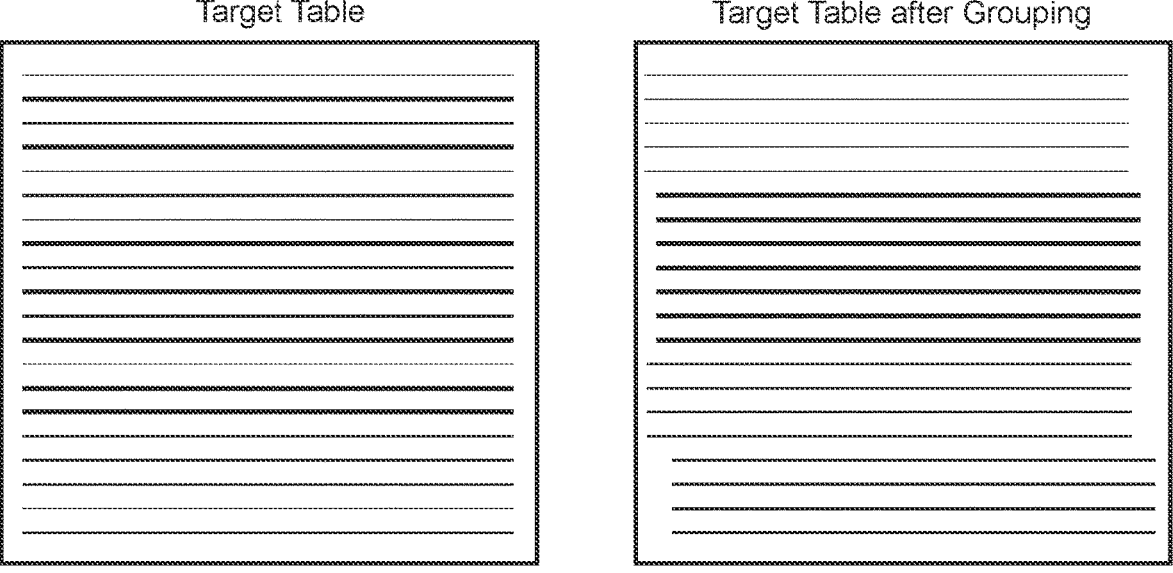

The key can be directly identified in the configuration file (see, e.g., FIG. 7B, which shows an example of a system configuration file). As shown in FIG. 7B, under "config_table_mode" there is a key called "recon_key" where the value of the key is "external Account". However, as should be understood, a different key: "account_num" can be used instead of "external_Account" to execute the above example illustrated in FIG. 7A. In an instance where a key is not provided (e.g., not in the system configuration file), then the system checks all the records in the target table to find the matches. Grouping the reconciled table data with or without a key can be cost-effective and computationally less time-consuming (see, e.g., FIGS. 8A, 8B, and 8C) because for each record bringing the dataset from the database to the memory will be very computationally expensive.

At step 520, data reconciliation is iterated over each group. After grouping, the dataset is fetched from the database only once for all the records belonging to the same group. Now, when new data comes in for reconciliation, the system can perform KNN only in that specific group.

At step 525, a machine learning model is used to find a closest match (partial matches) for each group. In some instances, the machine learning model uses a KNN algorithm to find similarities between new record data and the existing available records. In the present context, the system is using the machine learning model to find the k nearest transactions of a particular record for reconciliation.

The KNN algorithm is explained below:
1. Select the number K to find the closest match.
 a. Choosing a value of k may depend on the user of the application. The number "K" would determine how many suggestions will be produced by the KNN method during the reconciliation process.
2. A very small value of K bears a risk that a relevant suggestion might not be included. Whereas a very large number of "K" would add a huge amount of noise to the suggestions. The value of "K" can be set by user using the system's configuration file.
3. Choosing the features based on which reconciliation is to be performed:
 a. These features are the columns or fields present in the source and target table records.
 b. In the present instance, all the columns are being considered to reconcile the records so that information is not lost. For example, by default, the system takes all the features to proceed with KNN. However, alternatively the columns considered can be user configurable. For example, users can choose the fields/columns if they have domain knowledge and put the fields/columns in the configuration file to configure the system to use only those fields/columns to reconcile the records.

4. Relative Scoring:
 a. The relative scoring is calculated by picking the columns mapped in the configuration file. In other words, relative scoring is calculated based on the fields/columns defined by the user in the configuration file. If the user does not define any fields/columns, then all the fields/columns of the records are considered. The score is generated based on the datatype of the features. Relative scores (i.e., the relative distance) are generated for each column mapping individually.
 b. The relative scoring can be calculated as follows:
  i. Calculate the relative difference between each column's values:

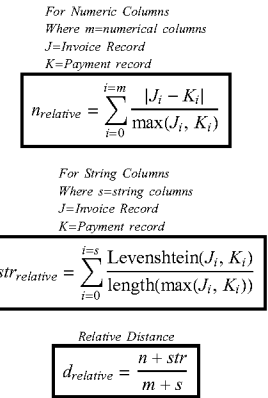

$$n_{relative} = \sum_{i=0}^{i=m} \frac{|J_i - K_i|}{\max(J_i, K_i)}$$

For Numeric Columns
Where m=numerical columns
J=Invoice Record
K=Payment record $$str_{relative} = \sum_{i=0}^{i=s} \frac{\text{Levenshtein}(J_i, K_i)}{\text{length}(\max(J_i, K_i))}$$

For String Columns
Where s=string columns
J=Invoice Record
K=Payment record $$d_{relative} = \frac{n + str}{m + s}$$

Relative Distance ii. Numerical Column: Calculates relative difference if the data type of the respective columns are integer or float.
  iii. String Column: Calculates Levenshtein distance if the data type of the respective columns is a string.
  iv. Calculate the mean score of all the feature values after generating the scoring vector for a single record. This mean score is considered as the relative score.
  v. The score generated for each column mapping is the relative difference score/feature score. The relative score/relative distance is the mean of the feature score/relative difference score of all the columns. Here, the relative difference refers to the difference between each field or column present in the source and target table records. The relative score/mean score/relative distance is the final outcome that represents how close the two records are. To avoid confusion, the relative difference can also be referred to as the feature score.
5. Once the scoring vector for a single record is generated, the system finds the mean of all the feature values to get a similarity index. The scoring vector is generated by combining the relative difference/feature score of each field of the records from the source and target table, as described above in detail. Then the mean scores corresponding to each record are sorted at step 530 and the best matches are fetched based on this top relative score.
6. At step 535, if the relative score is 100.0 then the matched record is called a perfect match. If the relative score is less than 100.0 then it is called partial match.
7. A threshold can be included to fetch the top desired records.

a. A threshold is an additional parameter to get the top records that are within desirable relative score limits. For example, consider where the system provides the top 5 records after performing reconciliation having relative scores of 98.90, 93.78, 87.88, 85, and 76.90. Now, if the user wants to fetch the records which are having a relative score of more than 80 then a threshold can be set as 80. This feature does not interfere with the process of reconciliation.

b. The system produces the top-matched suggestion for reconciliation which includes partial matches and part payments. A perfect match is a special case of a partial match (when the relative score is 100). Once the partial matches are obtained for each record, which may or may not include perfect matches (as it is based on score), the partial matches are appended to the final result. Consequently, the final result includes the partial matches and part payments for all the records in the source table.

At step 540, partial payments are identified for each group for potential aggregation. Generally, the process considers every column to get the respective part payments. Users can also mention the column name in the configuration file based on which payments are to be fetched. We have considered "vendorname" column to fetch the part payments in the example output 920 from FIG. 9B. So, based on the value of "vendorname" column of the source table record, it will fetch the part payments from the target table. The column name can be directly mentioned in the configuration file. For example, in FIG. 7, under "config_part_payment" there is a key called "column_to_consider" where the value of the key is "vendorname". Users can also directly mention the column name to get the part payments in the same way.

Aggregation is one of the key features of the approach which helps in knowing if the smaller part payments are in agreement with the source table data amount. The process considers every feature (e.g., the columns or fields of the records). to filter the respective part payments autonomously. Users can also choose the features for better outcomes (e.g., feature input based on domain knowledge). At step 545, the system sums up the part payment amounts and checks if the summed amount is equal to the amount of source table record. In other words, the system checks if the smaller part payments are in agreement with the source table data amount. To do this, the system sums up the part payment amounts and checks if it is equal to the amount of the source table record based on the user feature input. At step 550, tolerance is introduced in the pipeline as a tolerance value/threshold so that very small differences can be ignored. If both the amounts match, it is considered as a perfect part payment or perfect aggregation, or else it shows the part payments do not aggregate up to a perfect match with the amount of source table record.

Aggregation can be calculated as follows:

Calculate the difference for each feature:

$$diff_{amt} = amt_s - \sum amt_{pp}$$

Where, $diff_{amt}$=Difference in amount $amt_s$=source table record amount $amt_{pp}$=part payment amount from target table If $diff_{amt}$<=tolerance value, then it is a perfect part payment aggregation.

If $diff_{amt}$>tolerance value, then it is not a perfect part payment aggregation In certain instances, the tolerance value is set as 1 (however this parameter is user-configurable).

At step 555, once the records in all groups have been reconciled, the results of the partial matching and aggregation processes for the groups and records are output. The objective of the system is to provide the best matching suggestions to the end user. Conventionally, users had to go through the records manually. In some instances, the system provides the output in JSON format. In some instances, a User Interface (UI) can be rendered where the user can pick up a record from the source table and as an output top matches from the target table can be seen in tabular format within the UI. FIG. 9A shows an example input 905 and output 910 for partial matching. FIG. 9B shows an example input 915 and output 920 for partial payment.

As shown in FIG. 5, in some instances the process 500 includes the additional steps to handle multiple column mapping (also described herein as multi-column matching). Multiple column mapping is a user system configuration that can be set by a user in the system configuration file. At step 560, a determination is made as to whether multiple column mapping is on. If multiple column mapping is off, then the process 500 continues per normal at step 525 to process partial matches. If multiple column mapping is on, then the process 500 proceeds to step 565 to perform multiple column mapping based on column datatypes.

Figure 10:
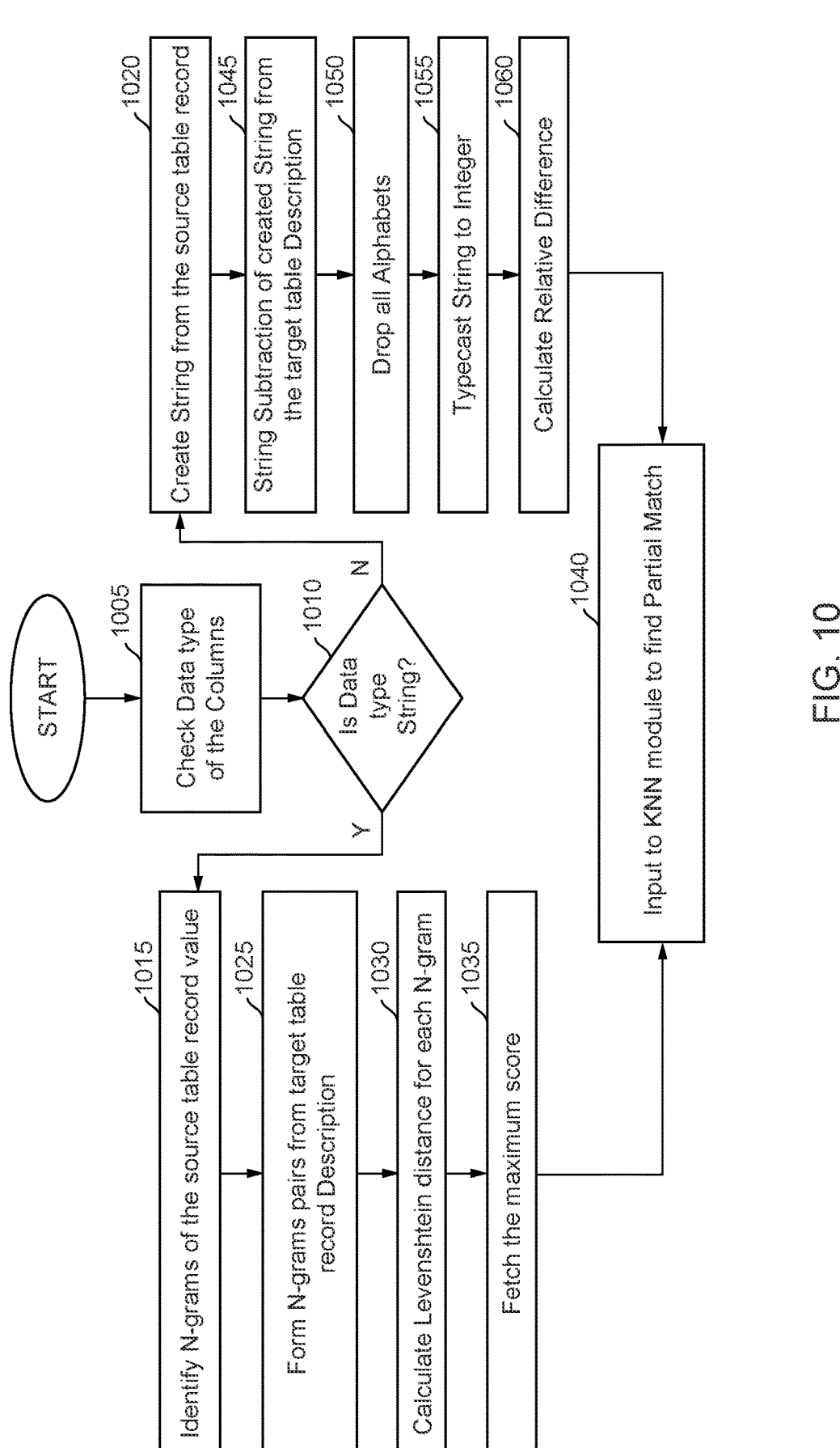
FIG. 10 is a process flow for handling multi-column matching or multiple column mapping in accordance with various embodiments.

As shown in FIG. 10, multiple column mapping is a subprocess 1000 comprising multiple steps. At step 1005 the data type of each column of both the source and target table is checked. At step 1010, a determination is made as to whether the data type is a string type. If data type is string, then the subprocess 1000 continues at step 1015. If data type is not string, then the subprocess 1000 continues at step 1020. At step 1015, N-grams of the source table record value are identified. At step 1025, N-grams pairs are formed from the target table record description. At step 1030, a Levenshtein distance is calculated for each N-gram. At step, 1035, the maximum score is fetched. At step 1040, the maximum score is input into step 525 of process 500 to find partial match. At step 1020, a string is created from the source table record. At step 1045, the created string is subtracted (sting subtraction) from the target table description. At step 1050, all alphabets are dropped. At step 1055, string is typecast to an integer. At step 1060, a relative difference is calculated. At step 1040, the relative difference is input into step 525 of process 500 to find partial match.

Illustrative Systems

Figure 11:
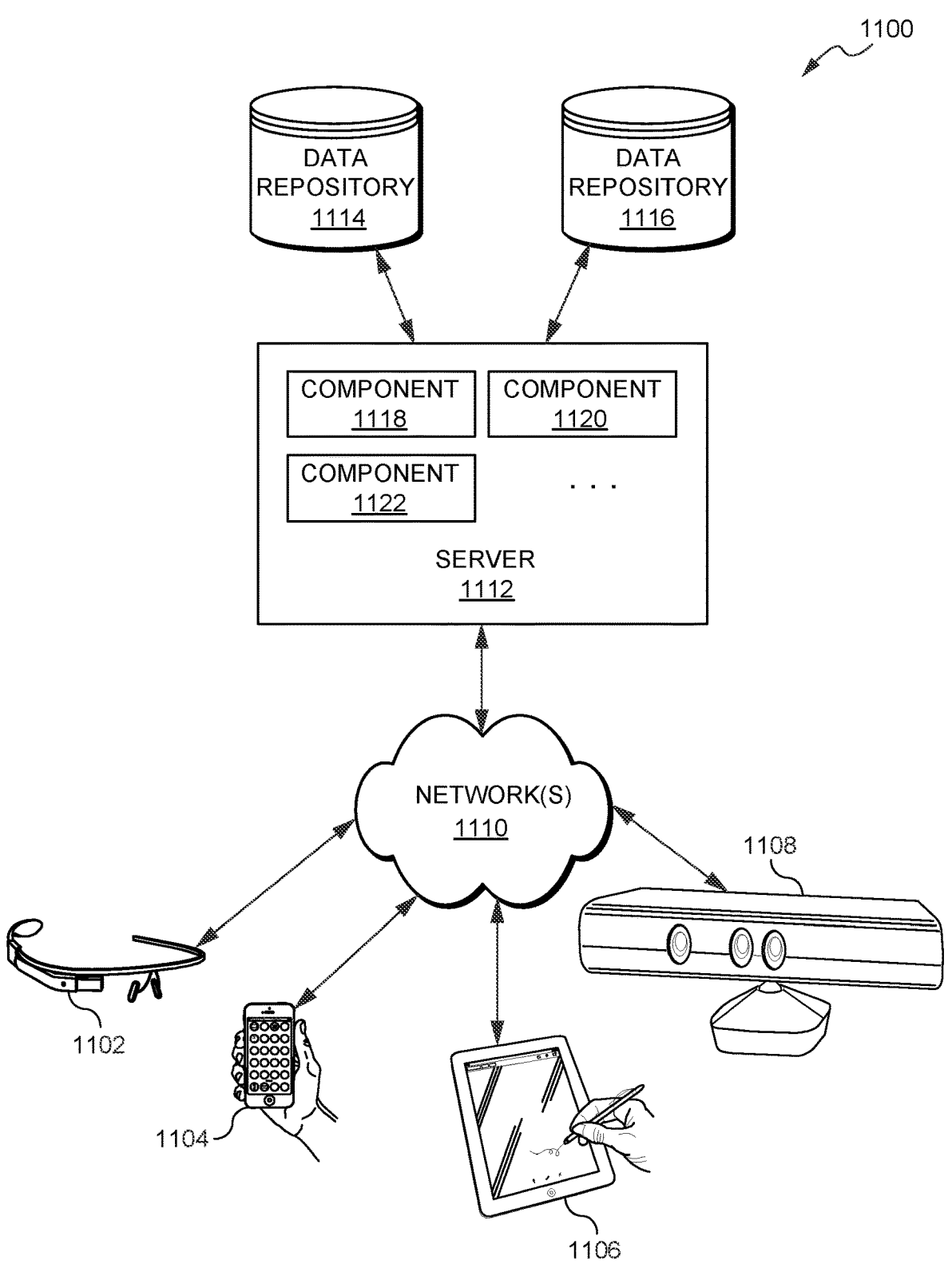
FIG. 11 depicts a simplified diagram of a distributed system for implementing various embodiments.

FIG. 11 depicts a simplified diagram of a distributed system 1100. In the illustrated example, distributed system 1100 includes one or more client computing devices 1102, 1104, 1106, and 1108, coupled to a server 1112 via one or more communication networks 1110. Client computing devices 1102, 1104, 1106, and 1108 may be configured to execute one or more applications. In certain implementations, the reconciliation engine 100 may reside at the server 1112.

In various examples, server 1112 may be adapted to run one or more services or software applications that enable one or more embodiments described in this disclosure. In certain examples, server 1112 may also provide other services or software applications that may include non-virtual and virtual environments. In some examples, these services may be offered as web-based or cloud services, such as under a Software as a Service (SaaS) model to the users of client computing devices 1102, 1104, 1106, and/or 1108. Users operating client computing devices 1102, 1104, 1106, and/or 1108 may in turn utilize one or more client applications to interact with server 1112 to utilize the services provided by these components.

In the configuration depicted in FIG. 11, server 1112 may include one or more components 1118, 1120 and 1122 that implement the functions performed by server 1112. These components may include software components that may be executed by one or more processors, hardware components, or combinations thereof. It should be appreciated that various different system configurations are possible, which may be different from distributed system 1100. The example shown in FIG. 11 is thus one example of a distributed system for implementing an example system and is not intended to be limiting.

Users may use client computing devices 1102, 1104, 1106, and/or 1108 to execute one or more applications, models or algorithms, which may generate one or more events or models that may then be implemented or serviced in accordance with the teachings of this disclosure. A client device may provide an interface that enables a user of the client device to interact with the client device. The client device may also output information to the user via this interface. Although FIG. 11 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 1110 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 1110 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1112 may be composed of one or more general purpose computers, specialized server computers (including, by way of example, PC (personal computer) servers, UNIXR servers, mid-range servers, mainframe computers, rack-mounted servers, etc.), server farms, server clusters, or any other appropriate arrangement and/or combination. Server 1112 may include one or more virtual machines running virtual operating systems, or other computing architectures involving virtualization such as one or more flexible pools of logical storage devices that may be virtualized to maintain virtual storage devices for the server. In various examples, server 1112 may be adapted to run one or more services or software applications that provide the functionality described in the foregoing disclosure.

The computing systems in server 1112 may run one or more operating systems including any of those discussed above, as well as any commercially available server operating system. Server 1112 may also run any of a variety of additional server applications and/or mid-tier applications, including HTTP (hypertext transport protocol) servers, FTP (file transfer protocol) servers, CGI (common gateway interface) servers, JAVAR servers, database servers, and the like. Exemplary database servers include without limitation those commercially available from Oracle®, Microsoft®, Sybase®, IBM® (International Business Machines), and the like.

In some implementations, server 1112 may include one or more applications to analyze and consolidate data feeds and/or event updates received from users of client computing devices 1102, 1104, 1106, and 1108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1112 may also include one or more applications to display the data feeds and/or real-time events via one or more display devices of client computing devices 1102, 1104, 1106, and 1108.

Distributed system 1100 may also include one or more data repositories 1114, 1116. These data repositories may be used to store data and other information in certain examples. For example, one or more of the data repositories 1114, 1116 may be used to store information such as information related to machine-learning model performance or generated machine-learning model for use by server 1112 when performing various functions in accordance with various embodiments. Data repositories 1114, 1116 may reside in a variety of locations. For example, a data repository used by server 1112 may be local to server 1112 or may be remote from server 1112 and in communication with server 1112 via a network-based or dedicated connection. Data repositories 1114, 1116 may be of different types. In certain examples, a data repository used by server 1112 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 1114, 1116 may also be used by applications to store application data. The data repositories used by applications may be of different types such as, for example, a key-value store repository, an object store repository, or a general storage repository supported by a file system.

Figure 12:
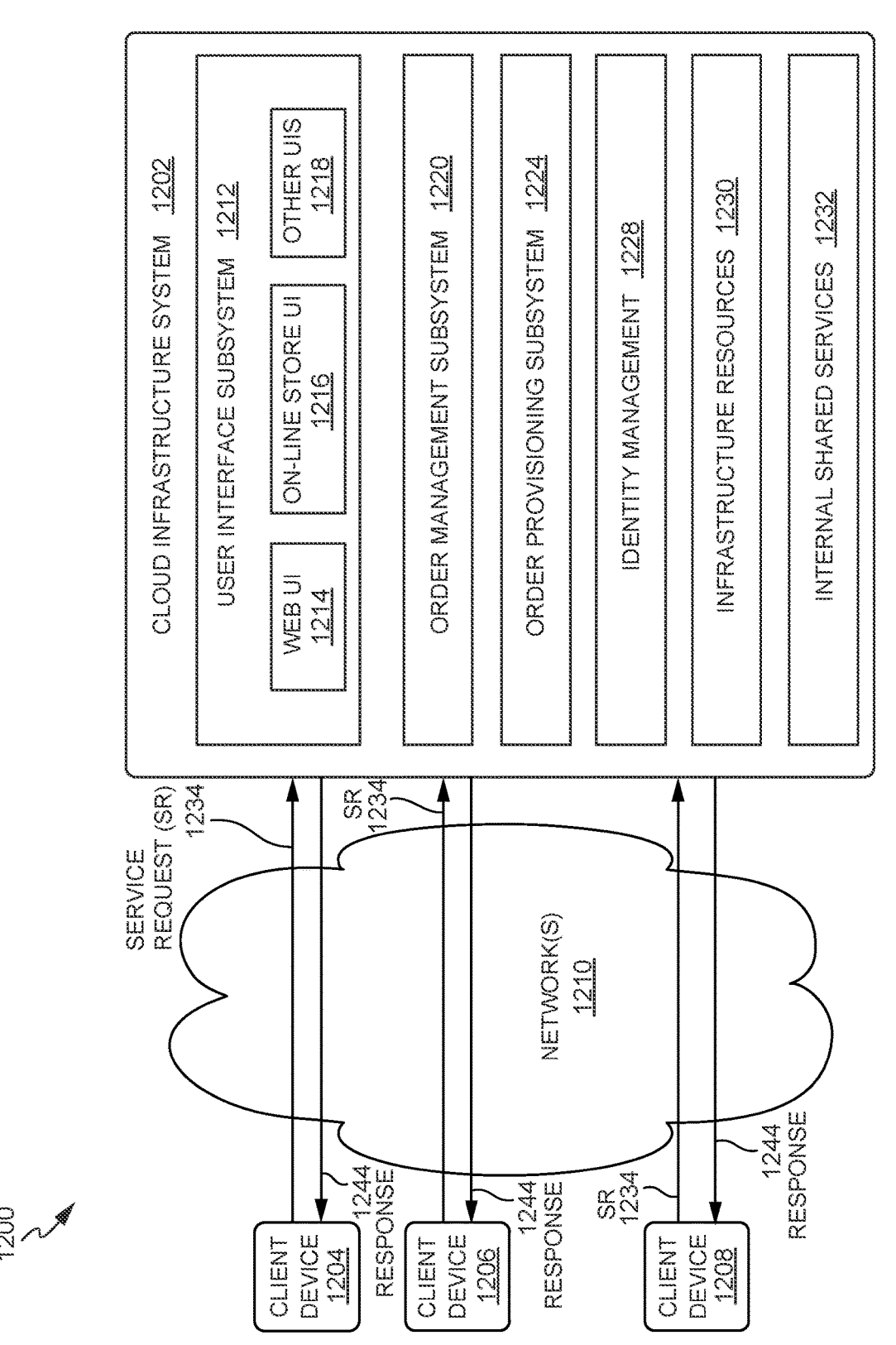
FIG. 12 is a simplified block diagram of one or more components of a system environment by which services provided by one or more components of an embodiment system may be offered as cloud services, in accordance with various embodiments.

In certain examples, the functionalities described in this disclosure may be offered as services via a cloud environment. FIG. 12 is a simplified block diagram of a cloud-based system environment in which various services may be offered as cloud services in accordance with certain examples. In the example depicted in FIG. 12, cloud infrastructure system 1202 may provide one or more cloud services that may be requested by users using one or more client computing devices 1204, 1206, and 1208. Cloud infrastructure system 1202 may include one or more computers and/or servers that may include those described above for server 1112. The computers in cloud infrastructure system 1202 may be organized as general purpose computers, specialized server computers, server farms, server clusters, or any other appropriate arrangement and/or combination.

Network(s) 1210 may facilitate communication and exchange of data between clients 1204, 1206, and 1208 and cloud infrastructure system 1202. Network(s) 1210 may include one or more networks. The networks may be of the same or different types. Network(s) 1210 may support one or more communication protocols, including wired and/or wireless protocols, for facilitating the communications.

The example depicted in FIG. 12 is only one example of a cloud infrastructure system and is not intended to be limiting. It should be appreciated that, in some other examples, cloud infrastructure system 1202 may have more or fewer components than those depicted in FIG. 12, may combine two or more components, or may have a different configuration or arrangement of components. For example, although FIG. 12 depicts three client computing devices, any number of client computing devices may be supported in alternative examples.

The term cloud service is generally used to refer to a service that is made available to users on demand and via a communication network such as the Internet by systems (e.g., cloud infrastructure system 1202) of a service provider. Typically, in a public cloud environment, servers and systems that make up the cloud service provider's system are different from the customer's own on-premises servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain examples, cloud infrastructure system 1202 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1202 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1202. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1202. Cloud infrastructure system 1202 then performs processing to provide the services requested in the customer's subscription order. For example, cloud infrastructure system 1202 may provide services for data reconciliation as described herein. Cloud infrastructure system 1202 may be configured to provide one or even multiple cloud services.

Cloud infrastructure system 1202 may provide the cloud services via different deployment models. In a public cloud model, cloud infrastructure system 1202 may be owned by a third party cloud services provider and the cloud services are offered to any general public customer, where the customer may be an individual or an enterprise. In certain other examples, under a private cloud model, cloud infrastructure system 1202 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 1202 and the services provided may be shared by several organizations in a related community. Various other models such as hybrids of the above mentioned models may also be used.

Client computing devices 1204, 1206, and 1208 may be of different types (such as client computing devices 1102, 1104, 1106, and 1108 depicted in FIG. 11) and may be capable of operating one or more client applications. A user may use a client device to interact with cloud infrastructure system 1202, such as to request a service provided by cloud infrastructure system 1202. For example, a user may use a client device to request information or action from a data reconciliation system or reconciliation engine as described in this disclosure, or from another system.

In some examples, the processing performed by cloud infrastructure system 1202 for providing services may involve model training and deployment. This analysis may involve using, analyzing, and manipulating data sets to train and deploy one or more models. This analysis may be performed by one or more processors, possibly processing the data in parallel, performing simulations using the data, and the like. For example, big data analysis may be performed by cloud infrastructure system 1202 for generating and training one or more models for a machine-learning recommendation system. The data used for this analysis may include structured data (e.g., data stored in a database or structured according to a structured model) and/or unstructured data (e.g., data blobs (binary large objects)).

As depicted in the example in FIG. 12, cloud infrastructure system 1202 may include infrastructure resources 1230 that are utilized for facilitating the provision of various cloud services offered by cloud infrastructure system 1202. Infrastructure resources 1230 may include, for example, processing resources, storage or memory resources, networking resources, and the like. In certain examples, the storage virtual machines that are available for servicing storage requested from applications may be part of cloud infrastructure system 1202. In other examples, the storage virtual machines may be part of different systems.

In certain examples, to facilitate efficient provisioning of these resources for supporting the various cloud services provided by cloud infrastructure system 1202 for different customers, the resources may be bundled into sets of resources or resource modules (also referred to as "pods"). Each resource module or pod may include a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1202 may itself internally use services 1232 that are shared by different components of cloud infrastructure system 1202 and which facilitate the provisioning of services by cloud infrastructure system 1202. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system 1202 may include multiple subsystems. These subsystems may be implemented in software, or hardware, or combinations thereof. As depicted in FIG. 12, the subsystems may include a user interface subsystem 1212 that enables users or customers of cloud infrastructure system 1202 to interact with cloud infrastructure system 1202. User interface subsystem 1212 may include various different interfaces such as a web interface 1214, an online store interface 1216 where cloud services provided by cloud infrastructure system 1202 are advertised and are purchasable by a consumer, and other interfaces 1218. For example, a customer may, using a client device, request (service request 1234) one or more services provided by cloud infrastructure system 1202 using one or more of interfaces 1214, 1216, and 1218. For example, a customer may access the online store, browse cloud services offered by cloud infrastructure system 1202, and place a subscription order for one or more services offered by cloud infrastructure system 1202 that the customer wishes to subscribe to. The service request may include information identifying the customer and one or more services that the customer desires to subscribe to. For example, a customer may place a subscription order for a service offered by cloud infrastructure system 1202. As part of the order, the customer may provide information identifying a machine-learning recommendation system for which the service is to be provided and optionally one or more credentials for the machine-learning recommendation system.

In certain examples, such as the example depicted in FIG. 12, cloud infrastructure system 1202 may include an order management subsystem (OMS) 1220 that is configured to process the new order. As part of this processing, OMS 1220 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1220 may then invoke the order provisioning subsystem (OPS) 1224 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1224 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 1202 as part of the provisioning process. Cloud infrastructure system 1202 may generate an application ID and select a storage virtual machine for an application from among storage virtual machines provided by cloud infrastructure system 1202 itself or from storage virtual machines provided by other systems other than cloud infrastructure system 1202.

Cloud infrastructure system 1202 may send a response or notification 1244 to the requesting customer to indicate when the requested service is now ready for use. In some instances, information (e.g., a link) may be sent to the customer that enables the customer to start using and availing the benefits of the requested services. In certain examples, for a customer requesting the service, the response may include a machine-learning recommendation system ID generated by cloud infrastructure system 1202 and information identifying a machine-learning recommendation system selected by cloud infrastructure system 1202 for the machine-learning recommendation system corresponding to the machine-learning recommendation system ID.

Cloud infrastructure system 1202 may provide services to multiple customers. For each customer, cloud infrastructure system 1202 is responsible for managing information related to one or more subscription orders received from the customer, maintaining customer data related to the orders, and providing the requested services to the customer. Cloud infrastructure system 1202 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1202 may provide services to multiple customers in parallel. Cloud infrastructure system 1202 may store information for these customers, including possibly proprietary information. In certain examples, cloud infrastructure system 1202 includes an identity management subsystem (IMS) 1228 that is configured to manage customer information and provide the separation of the managed information such that information related to one customer is not accessible by another customer. IMS 1228 may be configured to provide various security-related services such as identity services, such as information access management, authentication and authorization services, services for managing customer identities and roles and related capabilities, and the like.

Figure 13:
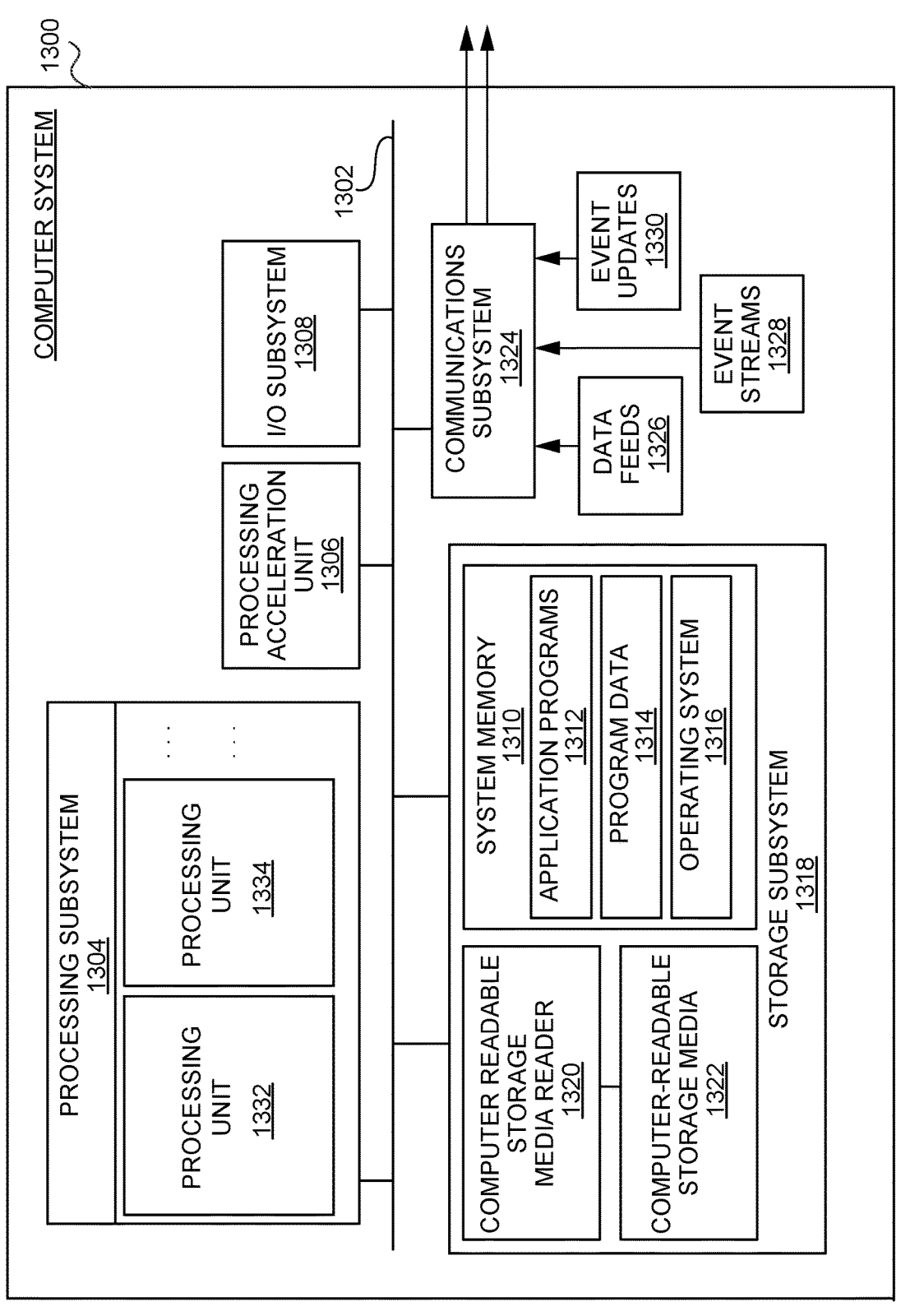
FIG. 13 illustrates an example computer system that may be used to implement various embodiments.

FIG. 13 illustrates an example of computer system 1300. In some examples, computer system 1300 may be used to implement the data reconciliation system or reconciliation engine within a distributed environment, and various servers and computer systems described above. As shown in FIG. 13, computer system 1300 includes various subsystems including a processing subsystem 1304 that communicates with a number of other subsystems via a bus subsystem 1302. These other subsystems may include a processing acceleration unit 1306, an I/O subsystem 1308, a storage subsystem 1318, and a communications subsystem 1324. Storage subsystem 1318 may include non-transitory computer-readable storage media including storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative examples of the bus subsystem may utilize multiple buses. Bus subsystem 1302 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 1304 controls the operation of computer system 1300 and may include one or more processors, application specific integrated circuits (ASICs), or field programmable gate arrays (FPGAs). The processors may include be single core or multicore processors. The processing resources of computer system 1300 may be organized into one or more processing units 1332, 1334, etc. A processing unit may include one or more processors, one or more cores from the same or different processors, a combination of cores and processors, or other combinations of cores and processors. In some examples, processing subsystem 1304 may include one or more special purpose co-processors such as graphics processors, digital signal processors (DSPs), or the like. In some examples, some or all of the processing units of processing subsystem may be implemented using customized circuits, such as application specific integrated circuits (ASICs), or field programmable gate arrays (FPGAs).

In some examples, the processing units in processing subsystem 1304 may execute instructions stored in system memory 1310 or on computer-readable storage media 1322. In various examples, the processing units may execute a variety of programs or code instructions and may maintain multiple concurrently executing programs or processes. At any given time, some or all of the program code to be executed may be resident in system memory 1310 and/or on computer-readable storage media 1322 including potentially on one or more storage devices. Through suitable programming, processing subsystem 1304 may provide various functionalities described above. In instances where computer system 1300 is executing one or more virtual machines, one or more processing units may be allocated to each virtual machine.

In certain examples, a processing acceleration unit 1306 may optionally be provided for performing customized processing or for off-loading some of the processing performed by processing subsystem 1304 so as to accelerate the overall processing performed by computer system 1300.

I/O subsystem 1308 may include devices and mechanisms for inputting information to computer system 1300 and/or for outputting information from or via computer system 1300. In general, use of the term input device is intended to include all possible types of devices and mechanisms for inputting information to computer system 1300. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1300 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1318 provides a repository or data store for storing information and data that is used by computer system 1300. Storage subsystem 1318 provides a tangible non-transitory computer-readable storage medium for storing the basic programming and data constructs that provide the functionality of some examples. Storage subsystem 1318 may store software (e.g., programs, code modules, instructions) that when executed by processing subsystem 1304 provides the functionality described above. The software may be executed by one or more processing units of processing subsystem 1304. Storage subsystem 1318 may also provide authentication in accordance with the teachings of this disclosure.

Storage subsystem 1318 may include one or more non-transitory memory devices, including volatile and non-volatile memory devices. As shown in FIG. 13, storage subsystem 1318 includes a system memory 1310 and a computer-readable storage media 1322. System memory 1310 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1300, such as during start-up, may typically be stored in the ROM. The RAM typically contains data and/or program modules that are presently being operated and executed by processing subsystem 1304. In some implementations, system memory 1310 may include multiple different types of memory, such as static random access memory (SRAM), dynamic random access memory (DRAM), and the like.

By way of example, and not limitation, as depicted in FIG. 13, system memory 1310 may load application programs 1312 that are being executed, which may include various applications such as Web browsers, mid-tier applications, relational database management systems (RDBMS), etc., program data 1314, and an operating system 1316. By way of example, operating system 1316 may include various versions of Microsoft Windows®, Apple Macintosh R, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry R OS, Palm® OS operating systems, and others.

Computer-readable storage media 1322 may store programming and data constructs that provide the functionality of some examples. Computer-readable media 1322 may provide storage of computer-readable instructions, data structures, program modules, and other data for computer system 1300. Software (programs, code modules, instructions) that, when executed by processing subsystem 1304 provides the functionality described above, may be stored in storage subsystem 1318. By way of example, computer-readable storage media 1322 may include non-volatile memory such as a hard disk drive, a magnetic disk drive, an optical disk drive such as a CD ROM, DVD, a Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 1318 may also include a computer-readable storage media reader 1320 that may further be connected to computer-readable storage media 1322. Reader 1320 may receive and be configured to read data from a memory device such as a disk, a flash drive, etc.

In certain examples, computer system 1300 may support virtualization technologies, including but not limited to virtualization of processing and memory resources. For example, computer system 1300 may provide support for executing one or more virtual machines. In certain examples, computer system 1300 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1300. Accordingly, multiple operating systems may potentially be run concurrently by computer system 1300.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to establish a communication channel to one or more client devices via the Internet for receiving and sending information from and to the client devices.

Communication subsystem 1324 may support both wired and/or wireless communication protocols. In certain examples, communications subsystem 1324 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 602.XX family standards, or other mobile communication technologies, or any combination thereof), global positioning system (GPS) receiver components, and/or other components. In some examples, communications subsystem 1324 may provide wired network connectivity (e.g., Ethernet) in addition to or instead of a wireless interface.

Communication subsystem 1324 may receive and transmit data in various forms. In some examples, in addition to other forms, communications subsystem 1324 may receive input communications in the form of structured and/or unstructured data feeds 1326, event streams 1328, event updates 1330, and the like. For example, communications subsystem 1324 may be configured to receive (or send) data feeds 1326 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 1324 may be configured to receive data in the form of continuous data streams, which may include event streams 1328 of real-time events and/or event updates 1330, which may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 1324 may also be configured to communicate data from computer system 1300 to other computer systems or networks. The data may be communicated in various different forms such as structured and/or unstructured data feeds 1326, event streams 1328, event updates 1330, and the like to one or more databases that may be in communication with one or more streaming data source computers coupled to computer system 1300.

Computer system 1300 may be one of various types, including a handheld portable device (e.g., an iPhone® cellular phone, an iPadR computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1300 depicted in FIG. 13 is intended only as a specific example. Many other configurations having more or fewer components than the system depicted in FIG. 13 are possible. Based on the disclosure and teachings provided herein, it should be appreciated there are other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMS, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method for automated reconciliation of data, the computer-implemented method comprising:

accessing, by one or more processors, source table data of a source table and target table data of a target table, the source table and the target table being stored in a database;

performing, by the one or more processors, intra-reconciliation on source records of the source table, the intra-reconciliation including identifying in the source table and removing duplicate source records, and combining source records with common field values in at least one field by summing amounts of the source records having the common field values, wherein the at least one field is specified by a user-configurable key in a system configuration;

grouping, by the one or more processors, the source table data and the target table data into groups based on a key value specified in the system configuration, the key value being a title of a column for a respective field, wherein the grouping reduces a search space for reconciliation;

reconciling, by the one or more processors, data for each group, wherein the reconciling is performed by iterating over each group and comprises performing for each group:

determining that a value of at least one column of the target table has a null value, determining that a multiple column mapping is on, as the system configuration, and in response to the multiple column mapping being on, performing for each column of the target table having the null value:

checking a data type, determining whether the data type is a string type, (1) when the data type is the string type:

identifying N-grams of a source table record value, forming N-gram pairs from a target table record description, calculating a Levenshtein distance between the N-grams of the source table record value and each pair of the N-gram pairs from the target table record description, fetching a maximum score derived from the Levenshtein distances, and assigning, as a value to the column, the N-gram pair having the maximum score, (2) when the data type is not the string type:

creating a string from a source table record, subtracting the created string from a target table record description, dropping all alphabets, and typecasting the string to an integer, and assigning to the column, wherein (1) and (2) are performed to obtain an updated target table having no null values;

determining, using a machine learning model, one or more closest matches for each group using the updated target table;

identifying, by the one or more processors, any partial payments in the target table for each group using the one or more closest matches, summing amounts of the partial payments to obtain a summed amount for each group, and checking whether the summed amount is equal to an amount of a corresponding source table record within a predefined tolerance; and outputting, by the one or more processors for each group, the one or more closest matches for each source record and a result of checking whether the summed amount is equal to the amount of the source table record within the predefined tolerance.

2. The computer-implemented method of claim 1, wherein, when the summed amount is equal to the amount of the source table record within the predefined tolerance, the summed amount is considered as a partial payment or aggregation.

3. The computer-implemented method of claim 2, wherein the machine learning model uses a k-nearest neighbors algorithm to find similarities between new record data in the source table and existing available records in the target table.

4. The computer-implemented method of claim 1, wherein the determining the one or more closest matches further comprises:

generating a scoring vector for a single record, finding a mean of all feature values to get a similarity index, sorting mean scores corresponding to each record, and fetching best matches based on top relative score.

5. The computer-implemented method of claim 1, wherein, when the data type is not the string type, the method further comprises:

calculating a relative difference; and inputting the relative difference into the machine learning model to find a closest match.

6. The computer-implemented method of claim 1, wherein the outputting further comprises displaying in a graphical user interface the one or more closest matches for each group and the result of checking whether the summed amount is equal to the amount of the source table record for each group.

7. A system comprising:

one or more processors; and one or more computer-readable media storing instructions which, when executed by the one or more processors, cause the system to perform operations including:

accessing source table data of a source table and target table data of a target table, the source table and the target table being stored in a database;

performing intra-reconciliation on source records of the source table, the intra-reconciliation including identifying in the source table and removing duplicate source records, and combining source records with common field values in at least one field by summing amounts of the source records having the common field values, wherein the at least one field is specified by a user-configurable key in a system configuration;

grouping the source table data and the target table data into groups based on a key value specified in the system configuration, the key value being a title of a column for a respective field, wherein the grouping reduces a search space for reconciliation;

reconciling data for each group, wherein the reconciling is performed by iterating over each group and includes performing for each group:

determining that a value of at least one column of the target table has a null value, determining that a multiple column mapping is on, as the system configuration, and in response to the multiple column mapping being on, performing for each column of the target table having the null value:

checking a data type, determining whether the data type is a string type, (1) when the data type is the string type:

identifying N-grams of a source table record value, forming N-gram pairs from a target table record description, calculating a Levenshtein distance between the N-grams of the source table record value and each pair of the N-gram pairs from the target table record description, fetching a maximum score derived from the Levenshtein distances, and assigning, as a value to the column, the N-gram pair having the maximum score, (2) when the data type is not the string type:

creating a string from a source table record, subtracting the created string from a target table description, dropping all alphabets, and typecasting the string to an integer, and assigning to the column, wherein (1) and (2) are performed to obtain an updated target table having no null values;

determining, using a machine learning model, one or more closest matches for each group using the updated target table;

identifying any partial payments in the target table for each group using the one or more closest matches, summing amounts of the partial payments to obtain a summed amount for each group, and checking whether the summed amount is equal to an amount of a corresponding source table record within a predefined tolerance; and outputting, for each group, the one or more closest matches for each source record and a result of checking whether the summed amount is equal to the amount of the source table record within the predefined tolerance.

8. The system of claim 7, wherein, when the summed amount is equal to the amount of the source table record within the predefined tolerance, the summed amount is considered as a partial payment or aggregation.

9. The system of claim 8, wherein the machine learning model uses a k-nearest neighbors algorithm to find similarities between new record data in the source table and existing available records in the target table.

10. The system of claim 7, wherein the determining the one or more closest matches further includes:

generating a scoring vector for a single record, finding a mean of all feature values to get a similarity index, sorting mean scores corresponding to each record, and fetching best matches based on top relative score.

11. The system of claim 7, wherein when the data type is not the string type, the operations further include:

calculating a relative difference; and inputting the relative difference into the machine learning model to find a closest match.

12. The system of claim 7, wherein the outputting further includes:

displaying in a graphical user interface the one or more closest matches for each group and the result of checking whether the summed amount is equal to the amount of the source table record for each group.

13. One or more non-transitory computer-readable media storing instructions which, when executed by one or more processors, cause a system to perform operations including:

accessing source table data of a source table and target table data of a target table, the source table and the target table being stored in a database;

performing intra-reconciliation on source records of the source table, the intra-reconciliation including identifying in the source table and removing duplicate source records, and combining source records with common field values in at least one field by summing amounts of the source records having the common field values, wherein the at least one field is specified by a user-configurable key in a system configuration;

grouping the source table data and the target table data into groups based on a key value specified in the system configuration, the key value being a title of a column for a respective field, wherein the grouping reduces a search space for reconciliation;

reconciling data for each group, wherein the reconciling is performed by iterating over each group and includes performing for each group:

determining that a value of at least one column of the target table has a null value, determining that a multiple column mapping is on, as the system configuration, and in response to the multiple column mapping being on, performing for each column of the target table having the null value:

checking a data type, determining whether the data type is a string type, (1) when the data type is the string type:

identifying N-grams of a source table record value, forming N-gram pairs from a target table record description, calculating a Levenshtein distance between the N-grams of the source table record value and each pair of the N-gram pairs from the target table record description, fetching a maximum score derived from the Levenshtein distances, and assigning, as a value to the column, the N-gram pair having the maximum score, (2) when the data type is not the string type:

creating a string from a source table record, subtracting the created string from a target table description, dropping all alphabets, and typecasting the string to an integer, and assigning to the column, wherein (1) and (2) are performed to obtain an updated target table having no null values;

determining, using a machine learning model, one or more closest matches for each group; using the updated target table;

identifying any partial payments in the target table for each group using the one or more closest matches, summing amounts of the partial payments to obtain a summed amount for each group, and checking whether the summed amount is equal to an amount of a corresponding source table record within a predefined tolerance; and outputting, for each group, the one or more closest matches for each source record and a result of checking whether the summed amount is equal to the amount of the source table record within the predefined tolerance.

14. The one or more non-transitory computer-readable media of claim 13, wherein, when the summed amount is equal to the amount of the source table record within the predefined tolerance, the summed amount is considered as a partial payment or aggregation.

15. The one or more non-transitory computer-readable media of claim 14, wherein the machine learning model uses a k-nearest neighbors algorithm to find similarities between new record data in the source table and existing available records in the target table.

16. The one or more non-transitory computer-readable media of claim 13, wherein the determining the one or more closest matches further includes:

generating a scoring vector for a single record, finding a mean of all feature values to get a similarity index, sorting mean scores corresponding to each record, and fetching best matches based on top relative score.

17. The one or more non-transitory computer-readable media of claim 13, wherein, when the data type is not the string type, the operations further include:

calculating a relative difference; and inputting the relative difference into the machine learning model to find a closest match.

* * * * *